(12) United States Patent
Ben Tolila et al.

(10) Patent No.: US 11,166,146 B2
(45) Date of Patent: Nov. 2, 2021

(54) COMBINED RISER IN BUILDING EMERGENCY REPEATER SYSTEM

(71) Applicant: HiRiseTech Ltd., Petach-Tikva (IL)

(72) Inventors: Itsick Ben Tolila, Petach-Tlkva (IL); Gadi Shirazi, Ramat-Gan (IL)

(73) Assignee: HiRiseTech Ltd., Petach-Tikva (IL)

( * ) Notice: Subject to any disclaimer, the term of this patent is extended or adjusted under 35 U.S.C. 154(b) by 49 days.

(21) Appl. No.: 16/618,139

(22) PCT Filed: May 24, 2018

(86) PCT No.: PCT/IL2018/050574
§ 371 (c)(1),
(2) Date: Nov. 28, 2019

(87) PCT Pub. No.: WO2018/220620
PCT Pub. Date: Dec. 6, 2018

(65) Prior Publication Data
US 2021/0144537 A1 May 13, 2021

Related U.S. Application Data

(60) Provisional application No. 62/512,025, filed on May 28, 2017.

(51) Int. Cl.
*H04W 4/90* (2018.01)
*H04B 17/318* (2015.01)
(Continued)

(52) U.S. Cl.
CPC ............ *H04W 4/90* (2018.02); *G02B 6/4466* (2013.01); *H01B 7/295* (2013.01);
(Continued)

(58) Field of Classification Search
None
See application file for complete search history.

(56) References Cited

U.S. PATENT DOCUMENTS

| 8,923,755 B2 | 12/2014 | Ben-Tolila | |
|---|---|---|---|
| 10,715,676 B2 * | 7/2020 | Wojtunik | ................ H04L 12/40 |
| 2013/0288592 A1 * | 10/2013 | Ben-Tolila | .............. H04W 4/90 |
| | | | 455/11.1 |

FOREIGN PATENT DOCUMENTS

| EP | 1570546 | 9/2005 |
|---|---|---|
| WO | WO 2004/051804 | 6/2004 |

(Continued)

OTHER PUBLICATIONS

International Preliminary Report on Patentability dated Dec. 12, 2019 From the International Bureau of WIPO Re. Application No. PCT/IL2018/050574. (16 Pages).

(Continued)

*Primary Examiner* — Adolf Dsouza

(57) ABSTRACT

Some embodiments of an emergency radio frequency (RF) repeater system includes a remotely adjustable conveyance characteristic between multiple antenna nodes and a repeater. Optionally, the characteristic may be adjusted independently for each node. Optionally, adjusting the conveyance characteristic after installation of system hardware simplifies system installation and/or facilitates precise balancing of conveyance and/or improves system performance. A conductive riser cable optionally carries multiple channels, for example including an RF signal and/or a communication/control signal and/or data and/or electrical power between system components. For example, the riser may carry a command to the adjustable coupler, to adjust a coupling factor between an antenna node and the riser. Optionally the riser includes a coaxial cable and/or is fire resistant. Optionally, portable transmitter location is estimated from received signal characteristics measured at nodes at different locations. Optionally, the data (for example measured signal propagation) is used to monitor system health.

21 Claims, 9 Drawing Sheets

(51) Int. Cl.
*G02B 6/44* (2006.01)
*H01B 7/295* (2006.01)
*H04B 7/155* (2006.01)
*H04W 24/10* (2009.01)

(52) U.S. Cl.
CPC ....... *H04B 7/15507* (2013.01); *H04B 17/318* (2015.01); *H04W 24/10* (2013.01)

(56) References Cited

FOREIGN PATENT DOCUMENTS

WO  WO 2016/009327   1/2016
WO  WO 2018/220620   12/2018

OTHER PUBLICATIONS

International Search Report and the Written Opinion dated Aug. 17, 2018 From the International Searching Authority Re. Application No. PCT/IL2018/050574. (25 Pages).
Addison "Caledonian FIRETOX LSZH Sheathed Fire Retardant Coaxial Cables", Addison—Caledionian-Tech, Brochure, p. 1-70, 2012.
Draka "Flame Retardant Vs. Fire Rated / Fire Resistive—What's the Difference?", Draka Cableteq Inc., Lifeline Technology, 2 P., Mar. 2009.
Gyppaz "Fire Resistance and Safety in Case of Fire", Nexans Research Center, Brochure. 12 P., Apr. 2014.
Tolstrup "Distributed Antenna Systems", Indoor Radio Planning, A Practical Guide for GMS, DCS, UMTS, HSPA and LTE, XP055089286, 2nd Ed., Chap.4: 123-202, Jul. 29, 2011.

\* cited by examiner

COMBINED RISER IN BUILDING EMERGENCY REPEATER SYSTEM

RELATED APPLICATIONS

This application is a National Phase of PCT Patent Application No. PCT/IL2018/050574 having International filing date of May 24, 2018, which claims the benefit of priority under 35 USC § 119(e) of U.S. Provisional Patent Application No. 62/512,025 filed on May 28, 2017. The contents of the above applications are all incorporated by reference as if fully set forth herein in their entirety.

FIELD AND BACKGROUND OF THE INVENTION

The present invention, in some embodiments thereof, relates to a radio repeater system and, more particularly, but not exclusively, to a system for repeating emergency radio communications in a building using distributed antenna nodes.

U.S. Pat. No. 8,923,755 to the current inventor appears to disclose "a system and/or method for facilitating wireless communication in an area where it is difficult to transmit and receive signals." The system "may use a preexisting wired emergency communication infrastructure to transmit signals between elements of a radio repeater system. Optionally, the system may include synchronization of retransmissions. Analog and/or digital signals and/or data may optionally be transferred over the preexisting network. Data and/or signals may optionally include audio and/or video signals, digital data, telemetry data, and/or synchronization data. The system may optionally include multiple wireless receivers and/or a voter to select a version of a signal from at least one of the receivers. A network for concurrent repeating of a direct mode simplex wireless signal may optionally include multiple receivers and/or a voter. The simplex network may optionally include a coloring circuit. The power of retransmission and/or the insulation between a receiver and a transmitter may optionally be adjusted."

International patent application publication no. WO 2016009327 appears to disclose "a self-monitoring, passive distributed antenna system (DAS) (100)" including, "at least one master controller (102) and a plurality of passive distributed antennas (20) connected via a radio frequency (RF) network (16) to the master controller (102), 5 each distributed antenna (20) being operable to emit an RF signal received via the RF network (16). The DAS (100) includes a plurality of slave receivers (120) coupled with the distributed antennas (20), the slave receivers (120) being connected to the RF network (16). The master controller (102) is operable to produce a test signal for transmission to, and emission by, the distributed antennas (20), and each slave 10 receiver (120) is operable to receive the test signal emitted by its coupled distributed antenna (20) and transmit a result signal indicative of characteristics of the received test signal back to the master controller (102), thereby to monitor transmission status of its coupled distributed antenna (20)."

International patent application publication no. WO 2004051804 appears to disclose "A distributed antenna system including at least one base station (2, 3), at least one transmission line (1), for transmission of signals, connected with the base station (2, 3) and at least two antennas (6, 8, 10). Each antenna (6, 8, 10) and the transmission line (1) are connected via a control device (5, 6, 7). The control device (5, 6, 7) includes only passive components and is arranged to divide signals into subsignals and/or to control the strength of the subsignals in order to minimize the interference within the by the distributed antenna system created network and between the by the distributed antenna system created network and surrounding at least one network. A method to minimize the interference within the by the distributed antenna system created network and between the by the distributed antenna system created network and surrounding at least one network, at which the distributed antenna system includes at least one base station (2, 3), at least one transmission line (1), for transmission of signals, connected with the base station (2, 3) and at least two antennas (6, 8, 10), at which the different antennas (6, 8, 10) are individually adjusted to/set to different signal strength levels with regard to the location of the antenna (6, 8, 10) within the by the distributed antenna system created network and in relation to surrounding at least one network."

SUMMARY OF THE INVENTION

According to an aspect of some embodiments of the invention, there is provided a radio repeater system including: a central control unit including: a radio frequency (RF) transceiver sending and receiving RF signals from a shared conductor of a riser cable; a processor producing a control signal; a data bus transferring the control to a peripheral device over the shared conductor; at least two antenna nodes, each of the at least two antenna nodes passively converting between emergency audio band radio waves and the RF signals, each of the at least two antenna nodes passively conveying the RF signals over a respective connection to the shared conductor; a variable coupler changing a conveyance characteristic of at least one of the respective connections with respect to another of the respective connections in response to the control signal received from the central control unit over the shared conductor.

According to some embodiments of the invention, the riser cable includes a coaxial cable.

According to some embodiments of the invention, the conveyance characteristic includes coupling coefficient.

According to some embodiments of the invention, the riser cable includes fire resistant shielding.

According to some embodiments of the invention, the riser cable includes fire resistant shielding.

According to some embodiments of the invention, the riser cable includes fire resistant shielding.

According to some embodiments of the invention, the radio repeater system further includes a sensor, the sensor connected to cable for communicating a measurement value over the riser to the processor.

According to some embodiments of the invention, the sensor uses externally supplied electrical power the system further including: a power converter for receiving electrical power from the riser cable and transferring the power to the sensor.

According to some embodiments of the invention, the radio repeater system further includes: an adjustable component of the repeater system, the adjustable component responsive to a command conveyed over the riser to adjust a conveyance parameter of an RF signal between the transceiver and at least one antenna of the plurality of antenna nodes.

According to some embodiments of the invention, the adjustable component uses externally supplied electrical power further including: a power converter for receiving electrical power from the riser cable and transferring the power to the adjustable component.

According to an aspect of some embodiments of the invention, there is provided a radio repeater system including: at least two antenna nodes, each of the at least two antenna nodes passively converting between emergency audio band radio waves and a respective RF signals, each of the at least two antenna nodes passively conveying the respective RF signals over a respective connection to a shared conductor of a riser cable a sensor registering a characteristic of at least one the respective RF signal on at least one of the respective connections; a peripheral signal bus signaling a value of the characteristic over the riser; a central control unit (CCU) including: a receiver receiving a combined RF signal including a plurality of the respective RF signal from the shared conductor; a central signal bus receiving the value of the characteristic from the shared conductor; a processor configured for determining a system status based on the characteristic and a transmitter for retransmitting at least part of the combined RF signal over the shared conductor.

According to some embodiments of the invention, the processor is configured for estimating the location of a portable transmitter based on the characteristic.

According to some embodiments of the invention, the estimating is based on comparing the characteristic at a plurality of the antenna nodes.

According to some embodiments of the invention, the central control unit is further configured for processing the characteristic and the combined signal and outputting an enhanced version of the at least part of the combined RF signal and wherein the transmitter retransmits the enhanced signal.

According to some embodiments of the invention, the system further includes: a database of previously measured data and system testing results, wherein the central control unit is further configured for comparing the data and a the previously measured data and outputting a command to change a conveyance parameter of the RF signals of at least one the respective connection with respect to at least one other the respective connection.

According to some embodiments of the invention, the riser cable includes a coaxial cable.

According to some embodiments of the invention, the riser cable is fire resistant.

According to some embodiments of the invention, the central control unit and the central bus are configured for conveying a command signal over the riser and further including: a dynamic coupler node including node signal bus for receiving the command signal from the riser and an adjustable coupler responsive to the command signal to change an coupling factor of the respective RF signal between the respective antenna node and the CCU.

According to an aspect of some embodiments of the invention, there is provided a method of testing a DAS including a plurality of passive antenna nodes including: isolating at least one node of the plurality of antenna nodes; transmitting an outgoing signal over the at least one node; receiving a received version of the signal outgoing over at least another node of the plurality of antenna nodes; processing the received version to determine a performance of at least one of the at least one node and the at least another node.

According to some embodiments of the invention, the processing includes comparing the received version to the outgoing signal.

According to some embodiments of the invention, the processing includes comparing at least one characteristic of the received version to a stored value.

According to some embodiments of the invention, the plurality of passive antenna nodes are connected to a central control unit (CCU) over a shared riser, the method further including: conveying the received version to the CCU over the shared riser.

According to some embodiments of the invention, the plurality of passive antenna nodes are connected to a central control unit (CCU) over a shared riser, the method further including: sending a value of a measured characteristic of the received version to the CCU over the shared riser.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

As will be appreciated by one skilled in the art, some embodiments of the present invention may be embodied as a system, method or computer program product.

Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such acquiring an image employing an intraoral scanner, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
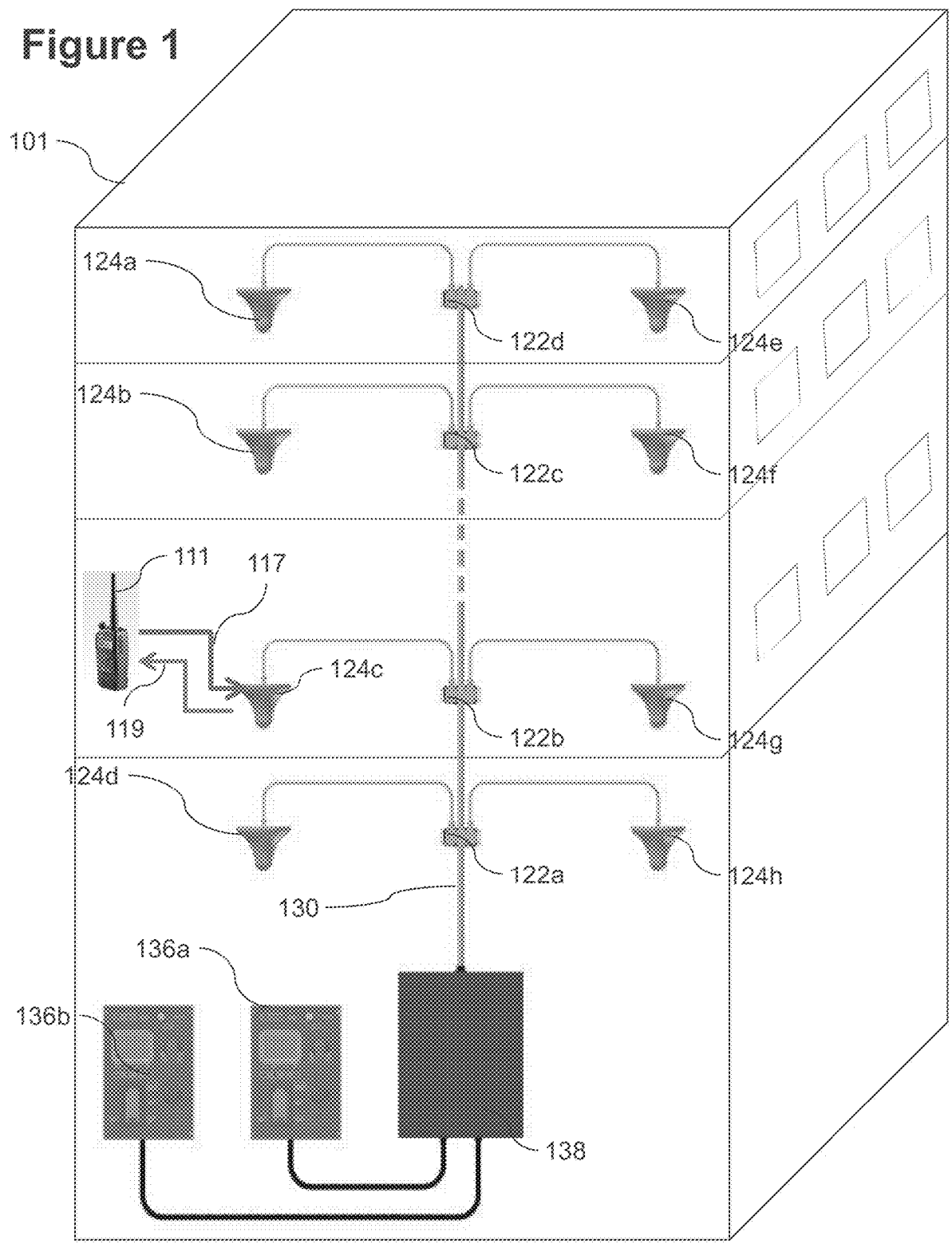
FIG. 1 is a is a schematic illustration of DAS system in accordance with an embodiment of the current invention.

The present invention, in some embodiments thereof, relates to a radio repeater system and, more particularly, but not exclusively, to a system for repeating emergency radio communications in a building using distributed antenna nodes.

Overview

An aspect of some embodiments of the present invention relates to an in building emergency radio frequency (RF) repeater system including a conductive RF coax (riser) cable carrying multiple channels. Optionally, the riser includes a fire resistant cable for example the cable may be a coaxial cable. In some embodiments, a conductor of the cable may carry an RF signal and/or a communication/control signal between components of the repeater system and/or data between components of the repeater system and/or electrical power. In some embodiments, a RF signal may be in various frequency bands, for example radio, microwave, a restricted emergency band (for example a band used by first responder portable transceivers), RF signals may include analogue signals and/or digital encoding.

In some embodiments, fire resistant cables and/or shielded cables may resist damage from various physical sources (for example the cable may retain integrity and/or continue to pass electric signals under flame and/or heat and/or water and/or corrosive chemical environments). For example, a fire resistant cable may fulfill North American UL-2196 and/or ULC S-139 standards and/or European Standard IEC 60331 (for example under 1 hour of exposure to 750 degrees C.) and/or military standards for example MIL-DTL-24643 standards. A fire resistant cable may fulfill British standards such as BS 7629-1 and/or BS 7846-1 and/or BS 60702-1. In some embodiments fire resistant cables may pass tests such as described in British standards including BS EN 50200 and/or BS 8491 and/or BS 8434-2:2003+A2:2009 and/or BS 6387.

In some embodiment, the system may fit regulatory definitions of a passive DAS system. Optionally the system is controlled and/or adjusted dynamically. For example, an RF signal may be conveyed passively by the cable from one or more antenna nodes to a receiver. Optionally, a conveyance characteristic between one or more antenna nodes and the receiver may be adjustable. For example the response and/or attenuation and/or coupling ratio may be adjustable. For example, an adjustment may be made without adding and/or without removing any physical components from the system. For example, the adjustment and/or measurement of one or nodes may be controlled remotely (for example: via a central communication unit CCU).

In some embodiments, a conductive riser emergency RF repeater system will be self-contained and/or disaster resistant. In some embodiments, use of a fire resistant cable for multiple channels may save significant money in construction of a disaster resistant repeater system. For example, with a multi-channel riser, the system may not include fire resistant ducts or fire resistant optical fibers or multiple physical media to carry power and/or signals and/or RF communication. Optionally, multiple channels may be carried on a single shared conductor. For example, a riser cable may be a single coaxial cable.

For example, a multi-channel conductive riser system may include a centralized and/or fire resistant power source and/or a fire resistant riser connecting peripheral nodes to a CCU. The system may not require multiple fire resistant wires and/or shielded ducts. For example, the system may operate with a single cable (e.g. a two conductor cable for example a coaxial cable) supplying all connections and power between the components. For example, the system may not need additional control connections (e.g. communication channels, wires and/or optical fiber connections) for signaling between components.

In some embodiments, a multi-channel conductive cable may supply a disaster resistant connection (e.g. a power supply connection and/or communication connection) between active repeater elements. For example, a fire resistant cable may connect between a CCU and/or a peripheral receivers and/or peripheral transmitters. In some embodiments, the cable may supply a backbone to an active repeater system. Alternatively or additionally, an active repeater component may use a wireless communication channel and/or a power grid. For example, the system may use a fire resistant cable for fire resistant back up power and/or communication. In some embodiments, use of a fire resistant conductor cable for emergency backup communication and power may save money compared to installing optical cables and/or fire proof ducts and/or a separate power source supply.

In some embodiments, power (e.g. DC voltage) is provided to the riser via a power supply. For example the power supply may be located in the CCU. The power supply is optionally isolated from the riser. For example, isolation may be provided by a coil (e.g. a RF choke). Isolation may facilitate the transfer of DC power while providing isolation between the RF signal and the DC voltage running on the riser.

An aspect of some embodiments of the present invention relates to a method of installing a passive DAS in building emergency RF repeater system. In some embodiments, installation of an adjustable DAS system may be simple, cheaper and/or less prone to failure than installation of a conventional passive DAS system. Optionally, the installer of an adjustable DAS system will not need to determine system characteristics (e.g. coupling ratios on each different floor) before installing the system. For example, a passive in building emergency RF repeater system may be installed into a building with adjustable couplers (e.g. splitters) connecting each antenna node to a riser cable of the system. For example, the system may be installed with a generic adjustable coupler (for example a coupler with variable coupling ratio) connecting between the riser and each antenna node that is split from the riser. After installation the adjustable couplers may be balanced, adjusted and/or calibrated.

In some embodiments, an installer determines locations and/or or installs peripheral units (for example a DAS antenna node and/or a user interface and/or a donor antenna) and/or a central unit (for example a CCU). For example, the peripheral units may be positioned to supply radio coverage to an entire building. Optionally, each antenna node is connected to a central unit by a riser cable. For example, multiple peripheral units may communication with the CCU over a single conductive element. Optionally, a connection between the peripheral unit and the riser may include an adjustable coupler. For example, the coupler may have an adjustable coupling ratio. Additionally or alternatively, a telemetry measurement system is installed. Optionally, the response of each antenna node and/or the attenuation of an adjustable attenuator and/or the coupling factor of an adjustable coupler for example a splitter is calibrated after installation. Additionally or alternatively a power source is installed. For example, the power source may be a DC power source. In some embodiments, an installed connection may be fire resistant.

In some embodiments, response of each antenna node and/or a balance among nodes is controlled dynamically. For example, response may be controlled from a CCU. Additionally or alternatively, telemetry data (for example received signal strength indication (RSSI) of a transmission from a firefighter radio that is received at an antenna node) may be measured and/or sent to the CCU. Optionally, RSSI of a received a signal may as received at different antenna nodes may be measured. For example data on the RSSI level at each node may be sent to the CCU.

In some embodiments, the CCU may be installed in a Fire Control Center (FCC). For example, the FCC may include a fire resistant closet and/or a fire resistant room. Optionally connection between the CCU and other components may be over a fire resistant cable. For example, the fire resistance cable may include a coaxial cable. Additionally or alternatively, the coaxial cable may convey an RF signal from an antenna node to the CCU.

In some embodiments, an installer may install a system to provide electrical power to various parts of the system. Optionally, electrical power may be supplied over a fire resistant connection. For example, a connector and/or a bus and/or a regulator may be connected to a fire resistant cable for communication of control command signals and/or power and/or RF signals. For example, signals may be transferred to, from and/or between the CCU and peripheral units of the system.

An aspect of some embodiments of the present invention relates to a method of testing, adjusting and/or calibrating adjustable elements of an RF repeater system. An RF signal may be received at various points in a coverage area and/or passed as a combined signal over a conductive cable. Telemetry data may be measured at various points in the coverage area and/or along the cable. Based on the telemetry data, the response of a part of the system may be adjusted. For example, a coupling factor and/or an attenuation may be increased or decreased to achieve a desired balance of signal response.

In some embodiments, calibration of the system may include transmitting a signal from one or more location and/or receiving the signal from one or more locations and/or measuring characteristics of the received signal in one or more locations. Parameters of the system are optionally adjusted based on the measurements. In some embodiments, data and/or control signals may be communicated using a transceiver separate from the repeater system. Alternatively or additionally data and/or control signals may be communicated over the repeater system. For example, the signal strength and/or other characteristics of an RF signal may be measured by measuring devices at various locations in the system domain using measuring devices that are independent of the DAS system. Alternatively or additionally parameters a signal may be measured at various locations on the DAS system.

For example, the quality of the signal and/or the condition of DAS components and/or conveyance characteristics of a cable and/or coupler may be estimated based on differences in signal characteristics around the system. Properties of signals arriving to the CCU may be measured and/or recorded. Based on signal parameters (for example RSSI) at each point, parameters of the system (for example the coupling ratio and/or attenuation between parts of the system) may be adjusted. A general coupling ratio may be adjusted at each point and/or the ratio may be frequency dependent and/or directionally dependent. Optionally, the conveyance parameters may be adjusted to provide even coverage of the building. Optionally, the conveyance parameters may be adjusted to control the power of signals transmitted out from the building. For example, transmission power of the repeater within a given range and/or reception within a given attenuation of the transmitted signal inside and/or outside one or more parts of the building.

In some embodiments a DAS includes a subsystem for isolating one or more antenna nodes. For example, isolating an antenna node may facilitate testing of the system. For example, an antenna mode may be isolated and then used to transmit a signal which is then received by other nodes. The reception at each of the other nodes is optionally measured by a sensor (for example an RF transceiver). For example, sensor data may be sent to a CCU and/or used to determine performance of the system and/or of a particular component of the system. Optionally, the system may be adjusted in response to the testing and/or parts of the system may be replaced and/or fixed in response to measurements.

In some embodiments, a signal may be transmitted from one antenna node of the system and measured at multiple receiving nodes of the system. For example, the transmission attenuation may set very high at all but one antenna when the signal is transmitted. In some embodiments the system may be calibrated dynamically in action. For example, while the system is in use the system may adjust itself according to telemetry data of received signals and/or transmitted signals. Optionally, the system parameters may be adjusted to adapt to changes in the physical layout of the coverage area and/or the system. For example, if an antenna fails and/or if a new antenna node is added the remaining nodes may be adjusted accordingly.

An aspect of some embodiments of the present invention relates adjusting components of a passive RF repeater system. Optionally, the adjustability of the system will save money in system setup and maintenance. For example, the system may be adjusted to keep performance without repairing or replacing the system. For example, the system may be adjusted to accommodate for environmental changes without requiring replacement of the system and/or with minimal physical changes to the system.

In some embodiments, the system includes multiple separate antenna nodes. Optionally, the antenna nodes are connected together by a conductive cable and/or a single conductive element. For example, the cable may include a length of coaxial cable. Optionally the system includes multiple signal testing nodes at different locations. Optionally, a signal testing node tests a signal characteristic and sends a result (for example telemetry data) to central processor and/or a remote processor. Optionally the signal testing node includes a local processor.

In some embodiments a signal mode receives electrical power from the conductive cable. In some embodiments the system may include one or more adjustable elements. For example an adjustable element may include a splitter, a power divider, a directional coupler, coupled transmission lines, branch-line coupler, Lange coupler, power dividers, Wilkinson power divider, hybrid coupler, hybrid ring coupler, multiple output divider, Waveguide branch-line coupler, Bethe-hole directional coupler, Riblet short-slot coupler, Schwinger reversed-phase coupler, Riblet short-slot coupler, Schwinger reversed-phase coupler, Moreno crossed-guide coupler, Waveguide hybrid ring, Magic tee, Cross-connected transformers, Resistive tee For example, the adjustable element may have an adjustable characteristics including, for example coupling ratio factor, isolation, directivity, amplitude balance, phase balance, attenuation.

In some embodiments, some or all of the adjustable components are controlled by a single controller. Optionally the controller adjusts multiple components to tune the system for example to improve performance and/or to adapt to changing conditions. For example, tuning may include balancing changes between components. For example, in order to increase relative strength of a first antenna node, the coupling factor to the first node may be increased while the coupling factor of other nodes may be decreased slightly. For example, to increase the reception from a second antenna node, the coupling factor to the second antenna node may be increased and/or to preserve the reception from other nodes, the coupling factor to the other nodes may also be increased (optionally the increase in coupling factor to the other nodes may be less than the increase in coupling factor to the second node). The coupling ratio is optionally adjusted by adjusting directional coupler RF parameters via digital or analog lines provided by the CCU.

In some embodiments, an adjustable system may have lower long term costs than a conventional passive DAS. For example, when a component wears and/or the system is changed, a conventional passive DAS system may require replacement of components throughout the system to achieve balanced coverage. Optionally, in a flexible passive system, components may be adjusted without requiring replacement and/or physical access to the components.

In some embodiments, the system may fit into a regulatory definition of a passive DAS system. For example, once adjusted, the system may run in a purely passive mode. For example, the system may function with the adjustable aspects of the system and/or communicating inactive. Alternatively, the system may be self-sufficient and/or survivable (for example power and communication may be supplied by fire resistant components). Passive and/or self-sufficient DAS systems may be advantageous, for example when they have more lenient regulatory requirements than active systems. For example, a passive DAS system may include fewer or simpler critical peripheral units than an active system. Optionally fire regulations for a passive DAS may be more lenient than for an active DAS for example in requirements for shielding of a power source and peripheral units.

In some embodiments, an adjustable passive DAS system may also include an active node and/or element. For example, an active node may include a receiver, and/or transmitter. For example, the active node may communicate with a central command unit over the same riser cable and/or conductive element that carries RF signals between the CCU and passive antenna nodes. Optionally the riser cable and/or conductive element may deliver power to an active node.

In some embodiments, an adjustable passive DAS system may include redundant components. For example, peripheral nodes of the system may receive power from an external power source (e.g. the power grid) and/or be connected to a redundant power source, for example a fire resistant cable. For example, components may communicate via wireless and/or optical connections and/or may communicate over a fire resistance cable. Optionally, the data rate of the system may be adjusted in response to changes in the carrier capacity when one component is fails and/or is overloaded.

In some embodiments, a DAS system may be adjusted to have a limited coverage and/or to limit interference the DAS domain. For example a DAS system in a building may supply RF coverage in an area of up to 50 meters and/or 100 meters and/or 1 block and/or up to 4 blocks surrounding a building. For example a DAS system may limit interference within a regulatory definition of non-interfering outside the DAS domain. For example an in building DAS system may limit interference in neighboring buildings and/or in an area beyond 50 meters and/or 100 meters and/or 1 block and/or up to 4 blocks surrounding the building.

In some embodiments an uplink (from a portable transceiver to the DAS system) and/or a downlink (from the DAS system to a portable transceiver) may have a quality of better than 3.4 DAQ and/or between 3 to 4 DAQ and/or 2 to 5 DAQ. Optionally the system will have audio symmetry for example in the quality of uplink and downlink connections.

In some embodiments, a DAS system will operate using standard Radios. For example, first responders may use their standard radios and/or standard setting inside the DAS zone as outside. For example, the system may work with fire-fighting radios and/or police radios and/or Emergency Medical Technician EMT radios. Optionally, the system allows sharing and/or separating of calls between groups of different radios.

In some embodiments, a DAS may sense and/or display an ID of a mobile user (for example a firefighter operating in the building during a fire) and/or his position in the Building (for example on a floor level basis). For example, the system will show this information on demand and/or automatically when a communication is received from the user and/or on demand.

In some embodiments, a DAS system will record voice traffic. For example, recordings may be stored in a console and/or in a remote location.

In some embodiments, a DAS system will conform to regulatory requirements. For example, a system may conform to requirements of the New York City Building Department's Building Bulletin 022 and National Fire Protection Agency (NFPA 72, 1221).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

DAS Systems

FIG. 1 is a schematic illustration of DAS system in accordance with an embodiment of the current invention. In some embodiments, a passive DAS system may have enhanced performance and/or flexibility. For example, the system may include one or more couplers that are adjustable remotely and/or dynamically. For example, a coupling factor between components may be adjusted after installation of the system. Optionally, the system will provide a desired power to each antenna on each floor and/or maintain a desired communication between firefighters and a commander controlling the system, for example located in the building lobby, through the DAS system. Optionally, a signal may be enhanced before repeating. For example, a multipath combined signal may be processed to produce a clean signal for repeating. For example, signal processing may make use of data and/or instructions previously stored. For example the data may include telemetry data measured at one or more points over the DAS system (for example a measurement of RSSI at adjustable coupler located on each floor) and/or data and/or instructions that were determined during system setup and/or calibration. In some embodiments, a riser cable may carry an RF signal and/or data and/or commands between components of the system. Optionally, the riser may include a coaxial cable and/or a fire resistant cable.

In some embodiments, a DAS system is installed in a building 101. For example, multiple antenna nodes 124a-124h may be positioned in locations around building 101. Optionally, each antenna 124a-124h is connected to a riser cable 130 and/or a shared conductive element of cable 130 via one or more couplers 122a-122d. For example, each coupler 122a-122d may include a splitter and/or a combiner and/or a directional coupler. The connection characteristics between the riser 130 and each antenna node 124a-124h may optionally be adjusted. For example, one or more coupler 122a-122d may have an adjustable characteristic. For example, the coupling factor may be adjusted to reduce interference between signals and/or to avoid causing interference outside of the system domain (for example outside the building). Optionally, signals, power and communication may share sent over riser 130 may share the same conductive element. For example, riser cable 130 may be comprised of two conductive elements and/or may be a single coaxial cable.

In some embodiments, a central control unit 138 is connected to the riser cable 130 and/or the shared conductive element. For example, RF signals received by antenna nodes 124a-124h may be conveyed over couplers 122a-122d and/or cable 130 to CCU 138. Optionally, signal characteristics (e.g. telemetry data) may be measured at various points around the system, for example, at antenna nodes 124a-124h and/or couplers 122a-122d. Measured characteristic values may optionally be transferred to CCU 138 over cable 130. Optionally, CCU 138 processes a combined output of antennas 124a-124h using telemetry data. For example, telemetry data may be used to recognize and/or reduce multipath noise. For example, CCU 138 may process a combined signal to get a single and/or enhanced version of a received signal. The enhanced version of the signal is optionally retransmitted by the CCU 138 over antennas 124a-124h. In some embodiments, communication may be over a duplex band, e.g. the retransmitted signal may be over a different band than the original signal. Alternatively or additionally, communication may be over a simplex band, e.g. the retransmitted signal is on the same band as the original signal.

In some embodiments, CCU 138 controls communication characteristics of the system. For example, CCU 138 may set the coupling factor for signals passing through one or more of couplers 122a-122d. Optionally coupling factor is dependent on direction and/or band and/or frequency. For example, coupling factor may be decreased on signals transferred from CCU 138 to antenna 124a. For example, decreasing coupling factor may reduce interference to external signals outside building 101. For example, coupling factor may be increased for signals from antenna 124a to CCU 138, for example to improve coverage of an area of building 101 in the vicinity of antenna node. For example, in a duplex system the frequency of an uplink (from a portable transceiver to the DAS) may different from the frequency of a downlink (from the DAS to the portable transceiver). Optionally, there will be a lower coupling factor and/or higher attenuation on the downlink than on the uplink.

In some embodiments, a DAS system may be used for emergency communication inside building 101. For example, a firefighter in the building may use a standard portable transceiver 111 to maintain effective communications from various locations on any floor in the building. Communication may include uplink 117 signals from portable transceiver 111 to the DAS system and or downlink 119 signals from a DAS system to a portable transceiver 111.

In some embodiments, the system is composed of one or more user interfaces 136a-136b. For example, interface 136a may include a standard ground-floor console for Channel 11 and/or interface 136b may include Channel 12 activation. Optionally a user interface 136a-136b may be inside building 101 or outside. Optionally, a cable connects each Console to CCU 138. For example, CCU'138 may be in the Fire Control Center (FCC) of the Building. Alternatively or additionally, one or more of user interface 136a-136b may connect wirelessly to CCU 138. CCU 138, is optionally, connected to RF Riser 130. Riser 130 optionally, distributes signals to an array of couplers 122a-122d. For example, there may be one or more couplers 122a-122d on each floor. Each coupler 122a-122d is optionally connected to at least two antennas. For example, a coupling characteristic of each antenna is optionally adjustable independently.

A voice signal from a Firefighter, as received by multiple antennas 124a-124h, is optionally processed by CCU 138 in real time and returned to the whole building via retransmission through couplers 122a-122d and/or RF Riser, 130 and/or antennas 124a-124h. The system may facilitate communication over portable transceivers over the entire building (for example over 95% of the interior volume of building 101). For example, coverage may include over 90% and/or more than 97% and/or more than 95% of building and/or over more than 99% over the building.

In some embodiments, signal strength is dynamically modified according to needs. Optionally, automated control of strength of output power per antenna depends on the structure of the building. For example, signal strength may be increased in one unit in response to failure of another unit in order to cover the area of the lost unit. Alternatively or additionally, power may be increased to cover spaces that become isolated due for example to construction of a new obstruction to RF signals. Alternatively or additionally, power may be reduced if interference is detected with another transmitter and/or receiver. For example: if a fire in a high rise building is effected on the 10 top floors, the CCU may adjust the adjustable couplers at the top floors to provide better communication with the commander, for example by adjusting (e.g. increasing) their coupling coefficient via CCU remotely.

In some embodiments, the system includes a built in maintenance mechanism that monitors the system health. For example, the monitoring may be cyclic and/or constant. For example, the mechanism may monitor the transmission power level of each antenna and/or VSWR (Voltage Standing Wave Ratio). In the event that a monitored parameter indicates a possible problem of a system and/or a component of the system, the maintenance mechanism optionally raises an alarm. For example, a notification may be sent to a user interface 136a, 136b. Alternatively or additionally a notification may be sent over a network connection, for example to an email of a maintenance worker. Alternatively or additionally the system may be adjusted automatically to correct the problem. For example, the system may include a processor that processes monitored data and/or determines system problems and/or and outputs commands and/or warnings.

In some embodiments, a DAS system is passive. For example, the system may fit a regulatory definition of a passive DAS system. Optionally, external power may be required only by the CCU in the FCC. Optionally, peripheral devices may be passive and/or self powered and/or supplied with power over the same cable used for communication and/or RF signals. Optionally the cable may be shielded and or fire resistant. In some embodiments, in the case of a power failure, peripheral devices (e.g. devices not located at the CCU location), for example, end units and/or couplers may function passively (for example—units that require power for active adjustment may continue to function according to the latest settings after they lose power). For example, a CCU that uses telemetric data for enhancing signals may continue to repeat signals and/or enhance signals with reduced data when a peripheral sensors reporting the telemetric data fails (for example due to lack of power). For example, an adjustable coupler may continue to work according to previous settings when a remote adjustment mechanism fails, for example due to a power failure.

Figure 2:
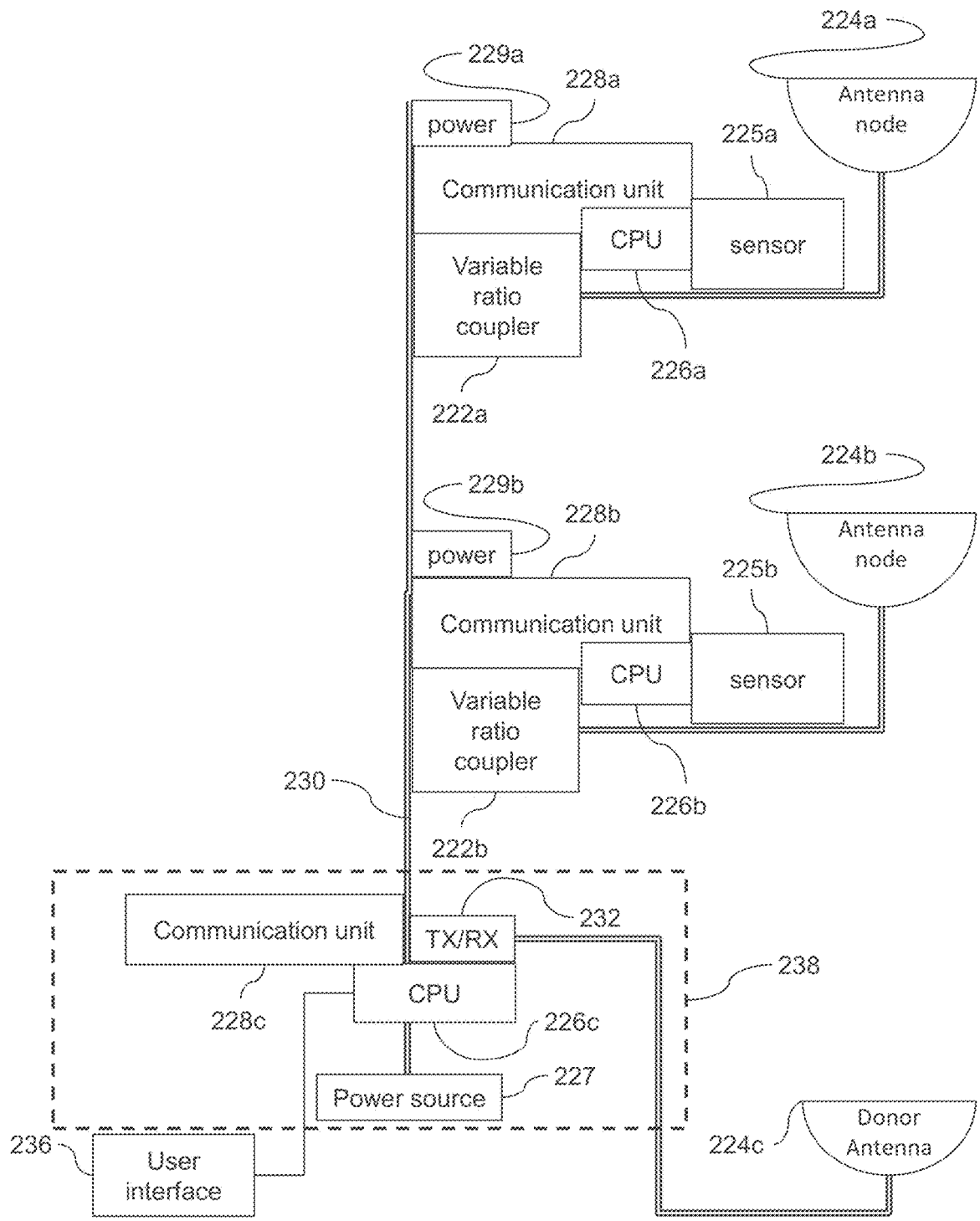
FIG. 2 is a is a block diagram illustrating a DAS system in accordance with an embodiment of the current invention.

FIG. 2 is a block diagram illustrating a DAS system in accordance with an embodiment of the current invention. In some embodiments, a DAS system includes a bi-directional amplifier 232 which feeds RF signals to and/or from multiple antenna nodes 224a, 224b over a to a riser cable 230. Optionally, one or more sensors 225a, 225b measure signal characteristics at various points around the system. For example, the output of the sensors 225a, 225b may be used to adjust the response of the system and/or to monitor the RSSI level of firefighter transmissions. In some embodiments, the riser 230 may be used to transfer data (for example between sensor 225a, 225b and a processor, for example controller 226c) and/or to transfer commands between controller 226c and one or more adjustable elements (for example variable coupling factor couplers 222a, 222b). Optionally, signals, power and communication may share sent over riser 230 may share the same conductive element. For example, riser cable 230 may be comprised of two conductive elements and/or may be a single coaxial cable.

In some embodiments, coupling factor between the amplifier 232 and one or more antenna nodes 224a, 224b may be adjusted. For example, adjustments may be made by one or more adjustable couplers 222a, 222b.

In some embodiments, a communication unit 228a, 228b and/or 228c (for example including a signal bus) may connect sensor 225b and/or controller 226c and/or variable coupling factor coupler 222b to riser 230 for sending and/or receiving data and/or command signals. Communication unit 228a, 228b and/or 228c may include for example a modem. For example, the modem may digitize measured parameters and/or modulate and/or encode and/or demodulate and/or decode signals and/or data for transmission on riser 230.

In some embodiments, a DC power source 227 and/or a power conversion unit 229a, 229b may be attached to riser 230. For example, power source may supply power over riser 230 to a peripheral unit (for example to a communication unit 228a, 228b and/or to a processor, for example controller 226a, 226b and/or to an adjustable coupler 222a, 222b). Optionally a DC power conversion unit 229a, 229b may extract power from riser 230 and/or supply the power to a peripheral device. For example, a power conversion unit 229a, 229b may include a transformer and/or a pulse width modulation power supply and/or switching power supply. In some embodiments, power source 227 may include a generator and/or an energy storage device (for example a battery).

In some embodiments, peripheral units may be placed at various locations around a building and/or connected to a central controller. For example, peripheral units may include antenna nodes 224a and 224b that may be placed in different floors of a building and/or in different locations on a floor of a building. Optionally, various components of the system may be protected. For example, controller 226c and/or amplifier 232 may be located in a FCC 238. For example, riser cable 230 may be fire resistant (e.g. riser 230 may include fire resistant cable and/or fire resistant coaxial cable and/or a portion of riser 230 may pass through a fire protected duct). For example, a peripheral unit may be located in a fire resistant casing and/or may be made of fire resistant parts. Optionally the system includes a user interface 236.

In some embodiments, a central controller may relay signals between peripheral units and an external network. For example, amplifier 232 may relay signals between antenna nodes 224a, 224b and a donor antenna 224a that communicates with an external network (for example a cellular network and/or emergency responder network e.g. a Radio Access Network [RAN] and/or FirstNet).

In some embodiments, an outgoing signal strength may be adjusted. For example, sensor 225b may detect that an outgoing signal strength is too high at antenna 224b. Sensor 225b optionally sends the measured data to a controller 226c. Controller 226b, optionally, sends a command to an adjustable coupler to reduce outgoing signal strength at antenna node 224b. For example, controller 226c may send a command to variable coupler 222b to decrease a coupling factor and/or increase an attenuation between amplifier 232 and antenna node 224b. Alternatively or additionally controller 226c may send a command to variable coupler 222b to decrease a coupling factor between amplifier 232 and antenna node 224b. In some embodiments, sensor 225b may be directly connected to adjustable coupler 222b and/or a processor, for example controller 226b. For example, controller 226b may receive data from sensor 225b and/or adjust coupler 222b.

In some embodiments, signal may found to be too strong in a location and/or may found to interfere with other signals near an antenna. For example the broadcast signal strength may be measured during system calibration. Optionally, based on the measured signal strength, a controller 226b and/or 226c may be programmed to decrease outgoing signal strength at antenna node 224b. For example, instructions may be sent over riser 230 to controller 226b and/or to coupler 222b to decrease a coupling factor and/or increase an attenuation between amplifier 232 and antenna node 224b.

In some embodiments, an incoming signal may be adjusted. For example, when a signal received at antenna node 224a and conveyed to amplifier 232 is weak and/or of poor quality, a characteristic of a coupler 222a may be adjusted to improve reception of the signal. Optionally, if the signal is weak, an attenuation of coupler 222a may be reduced and or coupling factor is increased. For example, controller 226c may receive telemetry data from sensors 225a and/or 225b. For example, the telemetry data may show that a weak signal is being received at antenna node 224a more strongly and/or at higher quality than node 224b. The telemetry data may, in some embodiments, show that the signal as it is conveyed from node 224a to the central amplifier 232 is masked by noise and/or other signals from antenna 224b. Optionally, central controller 226c may increase coupling factor of coupler 222a and/or decrease coupling factor of coupler 222b. Alternatively or additionally, if the problem with the signal coming from node 224a is that it is too weak, but it is not being masked, then controller 226c may increase coupling factor of coupler 222a without changing coupling faction of couple 222b. Optionally, controller will also increase coupling factor of coupler 222b retain a balance of the relative power of signals from node 224b and node 224a. For example, the increase in coupling factor of coupler 222a may be more than the increase in coupling factor of coupler 222b.

In some embodiments, a signal may by processed and/or improved. For example, amplifier 232 may receiver a mixed signal from multiple antenna nodes 224a and 224b. For example, the mixed signal may include multiple path reception of a signal from a first portable transmitter. Communication unit 228c may optionally receive telemetry data about the signal as it is received at each antenna node 224a, 224b. Optionally, controller 226c may use the telemetry data to enhance the signal and/or output an enhanced version of the signal for retransmission. Optionally, the enhanced version of the signal may be retransmitted. For example, the enhanced version of the signal may be retransmitted over antennas nodes 224a and 224b. For example, in a duplex system, the enhanced version output may be retransmitted on a repeater band. Alternatively or additionally, the enhanced version of the signal may be retransmitted on the same band as received. Retransmission is optionally to a portable receiver in the building. Alternatively or additionally, an enhanced signal may be retransmitted over an external network and/or to an external device, for example over donor antenna 224c.

Installing a DAS System

Figure 3:
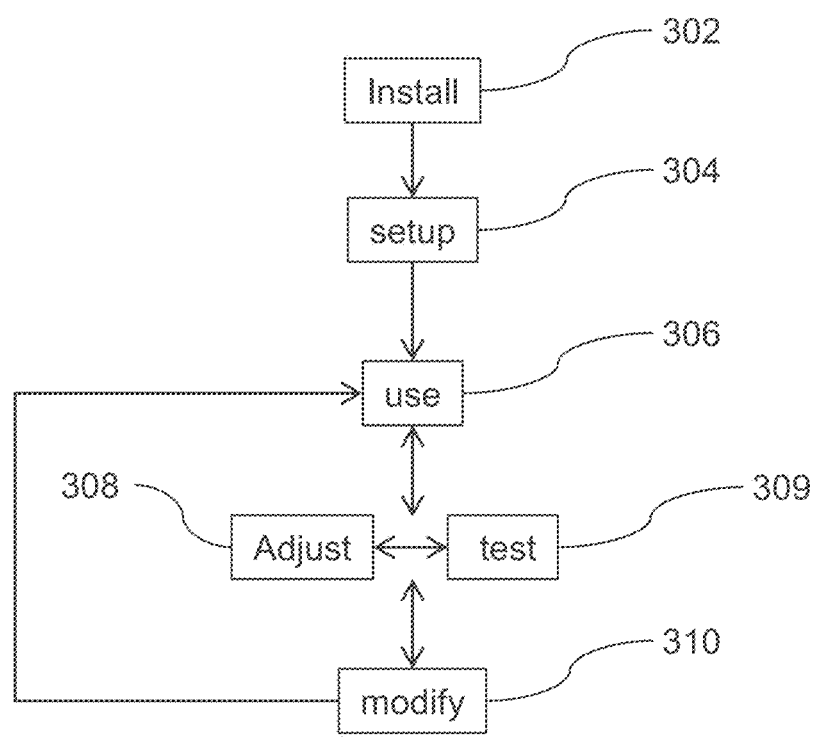
FIG. 3 is a is a high level flow chart of installing and maintaining a DAS system in accordance with an embodiment of the current invention.

FIG. 3 is a high level flow chart illustrated installing and maintaining a DAS system in accordance with an embodiment of the current invention. In some embodiments, adjustable couplers and/or passive components of a DAS system will be adjusted after installation. Optionally, the system will be installed without needing to predetermine all the system transmission parameters. For example, the system may be installed using generic and/or adaptable parts. After installation, the conveyance characteristics of the components and the system as a whole may be set up to precisely comply with the requirements of the particular application.

In some embodiment, the adjustability of a DAS system may be used during initial setup of the system and/or during maintenance of the system and/or during modification of the system. For example, during initial setup of the system the RF power reaching various antennas on different floors may be adjusted by controlling the coupling factor on each coupler. In some embodiments, adjustment is made after installation of hardware. For example, this may give more precise control over RF power delivered to each antenna than when adjustments are fixed at the time of installation. For example, this may make it easier to install hardware (for example, saving the installer from needing to know coupling ratios a-priori). For example, as parts age and/or are replaced transmission parameters of the aging part and/or other parts may be adjusted. Alternatively or additionally, when the system is modified, for example to cover a new portion of a building and/or to cover a new application (e.g. different band/higher bandwidth), existing parts may be adjusted. For example, if there are changes in the environment (e.g. expansion of a building, changes in radio obstacles, increased interference, placement of other networks that may experience interference) the system may be modified including adjusting conveyance parameters of existing components.

In some embodiments a DAS system may be installed 302 using adjustable and/or generic components. Optionally, after installation a system is setup 304. For example, setting up the system may involve setting adjustable parameters of adjustable elements. For example, RF parameters of couplers may be adjusted so that the system provides a desirable radio coverage and/or an acceptable level of inference with other networks and/or within the network. Adjustable components may save time and the need for expert installers who need to plan a priori exact characteristics of system components.

In some embodiments, after a system is running and/or in use 306, adjustable components may be adjusted 308. Adjustments 308 may be made to alleviate problems reported by users (for example interference, poor coverage etc.). Alternatively or additionally, the system may be tested 309 and/or adjusted 308 periodically and/or in response to an event (e.g. a problem). For example testing 309 and/or adjusting 308 may be in response to problems reported by users (for example interference, poor coverage etc.). Testing 309 may result in deciding to adjust 308 a parameter of an adjustable component and/or to modify 310 the system (for example, adding a component, replacing a component and/or removing a component). After the system is modified 310 it may be tested 309 and/or adjusted 308 and/or used 306. Over time the system may be maintained through testing 309, adjusting 308 and/or modifying 310. Optionally, maintenance activities including testing 309, adjusting 308 and/or modifying 310 may by cyclic, periodic and/or in response to events. Some maintenance activities may be made while the system is in use 306 and/or during stoppages of use 306.

Figure 4:
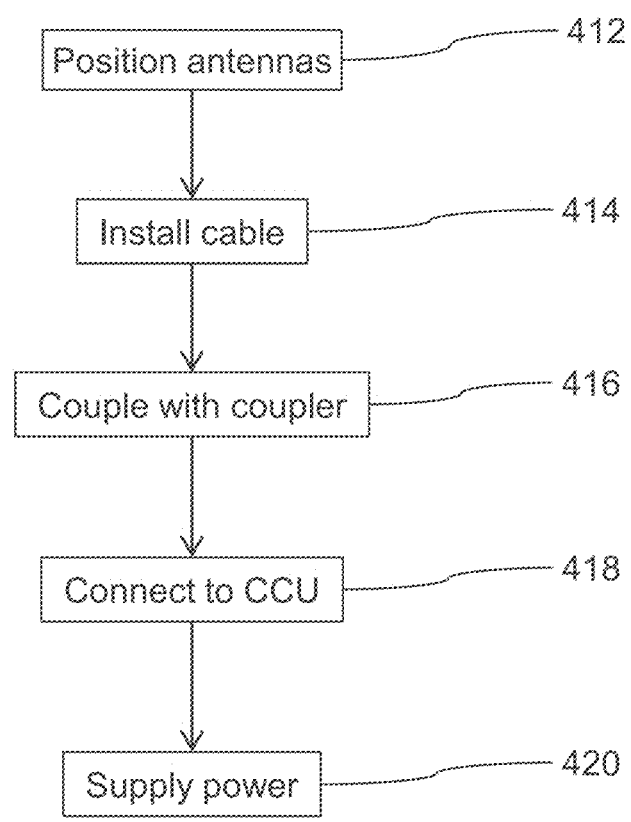
FIG. 4 is a is a flow chart including some details of installing a DAS system in accordance with an embodiment of the current invention.

FIG. 4 is a flow chart illustrating some details of installing a DAS system in accordance with an embodiment of the current invention.

In some embodiments, antenna nodes will be positioned 412 in and/or around an area of coverage of the system. For example, the area may be characterized identifying areas that need coverage, obstructions and/or areas where interference needs to be avoided. Optionally testing will be done of various areas for example to determine how well signals are conveyed between locations and/or zones. Optionally, other factors may come into consideration, for example the importance of an area for command and control of first responders during an emergency and/or the vulnerability of a location to disruption (for example fire and/or collapse) during an emergency. Optionally, an antenna node may be installed with protection against fire and/or shock and/or electrical and/or chemical hazards. The protection of an individual node may depend on the identified importance of the location and/or vulnerability thereof. Other considerations in choosing locations may include the accessibility and/or the feasibility and/or survivability and/or cost of providing a network connection (for example running a cable) to the location. For example, a building may be mapped to define the fire survivability of an antenna node at each location. The survivability may include the survivability of the node and the survivability of a connection to the node. A node may be positioned 412 at a location that has a higher survivability than another location. For example, a set of locations may be chosen to provide survivability above a chosen threshold and/or to cover a fixed portion of a building at a prescribed quality. Optionally an antenna node may be located near a protected cable (for example a fire resistant riser cable and/or a fire resistant duct).

In some embodiments, a riser cable and/or connecting cables may be installed 414. For example, a fire resistant cable may be installed 414 and/or a cable may be installed in a fire resistant location (for example in protected area of a building and/or a fire proof duct and/or an elevator shaft). Optionally a cable may include a coaxial cable. In some embodiments, a riser cable and/or connecting cables are installed. Optionally the cable is connected to one or more antenna nodes and/or sensors and/or adjustable couplers and/or a CCU and/or a power source and/or an RF transceiver.

In some embodiments, one or more couplers may couple 416 an antenna node to a riser cable. Optionally, a coupler may be adjustable. For example, the coupler may be adjustable in response to a remote signal sent over the riser cable and/or from the antenna node. Optionally, a single type generic coupler will be used to couple 416 different antenna nodes. For example, the same generic type coupler may supply different transmission parameters to different antenna nodes. Optionally, an installer will install an adjustable and/or generic coupler to couple 416 a riser without predetermining the transmission parameters of the coupler. In some embodiments, coupling 416 nodes with generic and/or adjustable couplers will save money and/or planning time and/or will require less skill than installation of a system with fixed couplers whose transmission parameters must be chosen prior to installation.

In some embodiments, a CCU will be connected 418 to a riser. For example, the CCU may be connected 418 to a riser cable. Optionally, the CCU and/or the connection will be protected. For example, the CCU and/or the connection may be positioned in a protected location (e.g. a FCC). Optionally, the connection to the riser cable will allow supplying of power, conveying of RF signals, and/or transfer of control signals and/or data between the CCU and peripheral nodes connected to the riser.

In some embodiments, power will be supplied 420 to various components of the system. Optionally, the supply of power will be protected. For example, supplying 420 power may include protecting a power source (e.g. placing a power source in a protected location and/or shielding the power source from fire, chemicals or physical disruption) and/or connecting the power source to a protected transmission medium (for example the riser cable) and/or connecting a peripheral component to a power transmission medium for example with a protected conversion unit.

Additional Optional Subsystems

Figure 5:
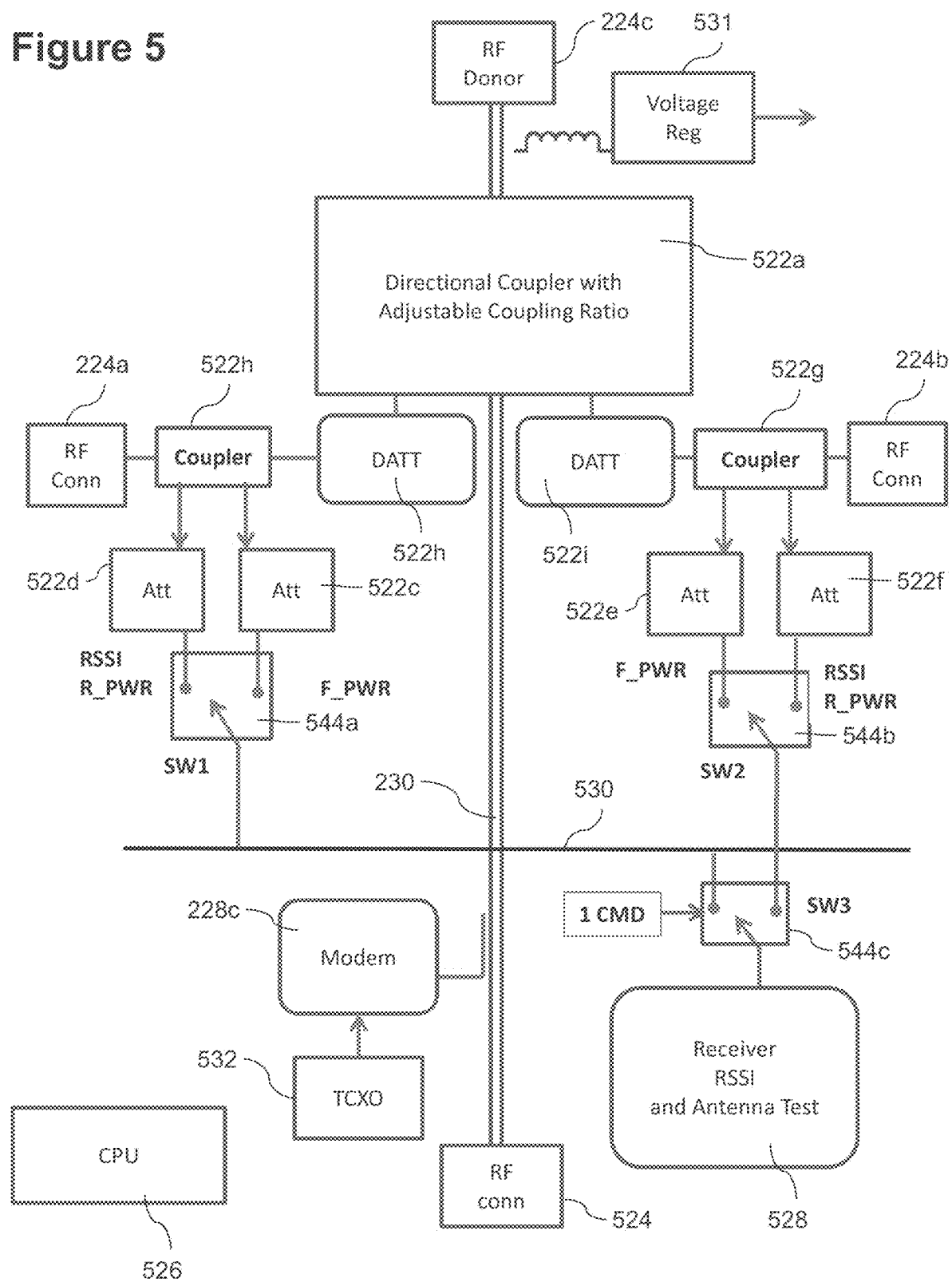
FIG. 5 is a illustrates an adjustable coupler in accordance with an embodiment of the current invention.

FIG. 5 illustrates a variable coupler in accordance with an embodiment of the current invention. Optionally a variable coupler includes a variable coupling factor coupler. Alternatively or additionally, the variable coupler may include a testing system that measures the transmission power, for example the power transmitted to an antenna node of a signal transmitted by the DAS system. Alternatively or additionally, the variable coupler may include a measuring system that measures the received power of a signal received from an antenna node.

In some embodiments, an antenna node is connected to a riser cable via a variable coupling factor directional coupler. For example, antenna nodes 224a and 224b are connected to a riser cable 230 by adjustable coupler 522a. Optionally, coupler 522a is responsive to signals sent over riser cable 230. For example, coupler 522a may include a series of directional sub-couplers with different coupling ratios that are connected by switches. The switches may be controlled by controller 526 to change the combination of sub-couplers and/or coupling ratio between antenna nodes 224a, 224b and riser 230. In some embodiments, opening and closing the switches requires a power source. Optionally power to the switches and/or signaling units associated with the switches may be supplied from riser 230. For example, a voltage regulator 531 (for example including a RF Choke) may extract DC power from the riser and supply it to the switches.

In some embodiments, antenna nodes 224a and/or 224b may be connected to directional coupler 522a via a digital attenuator (for example attenuators 522h and 522i respectively). For example, attenuators 522h and/or 522i may be adjustable and/or may be used to balance the power between antennas 524a and/or 524b. Alternatively or additionally, an antenna node may be connected directly to the variable attenuator. Digital attenuators 522h and/or 522i are optionally controlled by a controller 526.

In some embodiments, a DAS system may include a measuring system. For example, a coupler 522g and/or 522h may connect antenna nodes 224a and/or 224b respectively to a receiver 528. For example, coupling ratios may range between 1 to 10 dB and/or between 10 to 30 dB and/or between 30 to 50 dB. Receiver 528 optionally measures the RSSI of signals received and/or transmitted at antenna node 224a and/or 224b. Alternatively or additionally receiver 528 may measure a reflected and/or forward wave and/or be used for measuring VSWR and/or antenna performance (for example antenna disconnect or damaged or fully functional). In some embodiments, the transmitted power may differ significantly from the received power at an antenna node. For example, the outgoing transmitting power may range between 1 to 10 dBm and/or between 10 to 20 dBm and/or between 20 to 40 dBm. Effective Isotropic Radiated Power (EIRP) and/or the power of a received signal from a portable transceiver may range between −50 to −90 dBm and/or between −90 to −120 dBm. (For example the transmitting power may range from 5 to 10 and/or 10 to 13 and/or 13 to 20 orders of magnitude greater than the received power). In some embodiments, a transceiver may be used that can cover a large reception range, for example between 0 to −120 dBm. Alternatively or additionally, attenuators 522c, 522d, 522e and 522f are used to balance the signal received to receiver 528. For example, when measuring a received signal, attenuator 522f and/or 522d may be used to supply a small attenuation. For example, when measuring a transmitted signal attenuator 522e and/or 522c may be used to supply a larger attenuation. For example the attenuation of attenuators 522c and/or 522e may be between 1 to 3 and/or 3 to 10 and/or 10 to 15 and/or 15 to 20 orders of magnitudes greater than the attenuation of attenuators 522d and/or 522f for example the attenuation of attenuator 522e may range between 1-3 db and/or the attenuation of attenuator 522f may range between 10-30 db. In some embodiments, a set of switches are used to control what signal is being measured. For example to measure incoming RSSI at antenna node 224b, switches 544c and 544b are both switched to the right. For example to measure transmitted signal power at antenna node 224b, switch 544c is switched to the right and/or switch 544b is switched to the left. For example to measure incoming RSSI at antenna node 224a, switches 544c and 544a are both switched to the left. For example to measure transmitted signal power at antenna node 224a, 544a is switched to the right and/or switch 544a is switched to the left. Some or all of switches 544a, 544b and 544c. For example, a switch 544a, 544b and/or 544c may be controlled remotely by sending a signal along riser 230 and/or via a wireless connection. Optionally measurements are sent by receiver 528 to a controller 526. Optionally, controller 526 controls switches 544a, 544b and/or 544c and/or receiver 528, for example to control what is measured and/or when to make a measurement. Optionally, receiver 528 may communicate with controller 526 over a separate communication serial bus (not over the riser).

In some embodiments, communication between CCU and Smart Splitter is done via modem 228c over riser. For example, The RSSI readings conducted by receiver 528 are done by CPU 526 controlling receiver 528. This information is optionally sent to the CCU while CPU 526 is controlling and commanding the modem 228c to send the RSSI value to CCU over the riser.

In some embodiments, each floor of a building may include a variable factor coupler and/or multiple couplers on a single floor may connect the riser to different antennas and/or antennas on multiple floors may all be connected to a riser through a single coupler.

In some embodiments a DAS system may include an RF donor antenna. For example, the RF donor antenna may be used for connection to an outside network. Optionally, antenna 224c is connected to other elements of the system via the riser 530 and/or a variable ratio coupler (for example coupler 522a and/or a fixed ratio coupler).

In some embodiments, a DAS system may include a temperature compensated crystal oscillator TCXO 532. In some embodiments, a DAS system may include a test antenna node 224a, 224b. For example, a test signal may be transmitted from CCU over the riser. The test signal is progress to antenna ports 224a, 224b. By measuring the forward and reflected power from coupler 522g by receiver 528, it is possible to identify when the antenna is malfunctioning and/or fully operational (VSWR measurement).

In some embodiments, a test subsystem may include a communication unit that is wired to allow isolated connection to one or more antenna nodes. For example, an isolated connection may be made to a subset of antenna nodes to transmit a signal over those nodes. Alternatively or additionally, a communication unit may be connected to receive an RF signal from a particular antenna node and/or a subset of nodes.

In some embodiments, a testing system may include an active component (for example a switch) and/or a communication line that are separate from the DAS system and/or non-essential to the DAS system. For example, if a testing line and/or switch is damaged, the DAS system may continue to work with the testing function impaired. Optionally, non-essential components may be protected (for example with fire resistant components or shielding). Alternatively or additionally, some or all of the non-essential components may not be protected. For example, in the case of a fire, these components may be sacrificed while the system continues to function.

In some embodiments, a system may be tested and/or adjusted using a test signal transmitted from a subset of nodes. The transmitted wireless magnetic wave is optionally received by one or more other nodes. Optionally, a transmission parameter of the system may be adjusted based on the signal and/or reception parameters. For example, if the signal is received too weakly at a node then an adjustable coupler may be adjusted to increase a coupling factor and/or an adjustable attenuator may be adjusted to reduce an attenuation between the nodes and the riser. Optionally in a system with a larger number of antennas, the reception of one or more antennas will be tested when broadcasting from each of a plurality of other antennas. For example, a matrix of reception parameters for transmissions at different locations will be compared to a matrix of reception parameters that was measured when the system was tuned (for example when the system was originally setup and/or tested). The transmission parameters of one or more adjustable components are optionally adjusted to retune the system (for example to bring the matrix of reception closer to the previous tuned state).

In some embodiment, commands for adjusting an adjustable component may be communicated over a fire protected channel. Alternatively or additionally, in some embodiments the adjustability of the system may depend on non-protected components. For example, during a fire, a communication link to an adjustable element may not be protected. For example, if communication is lost, the components may remain at their last setting. Optionally the DAS system will continue to work at its last adjustment, but may lose some or all of its adaptive adjustability.

Testing and Adjusting a DAS System

Figure 6:
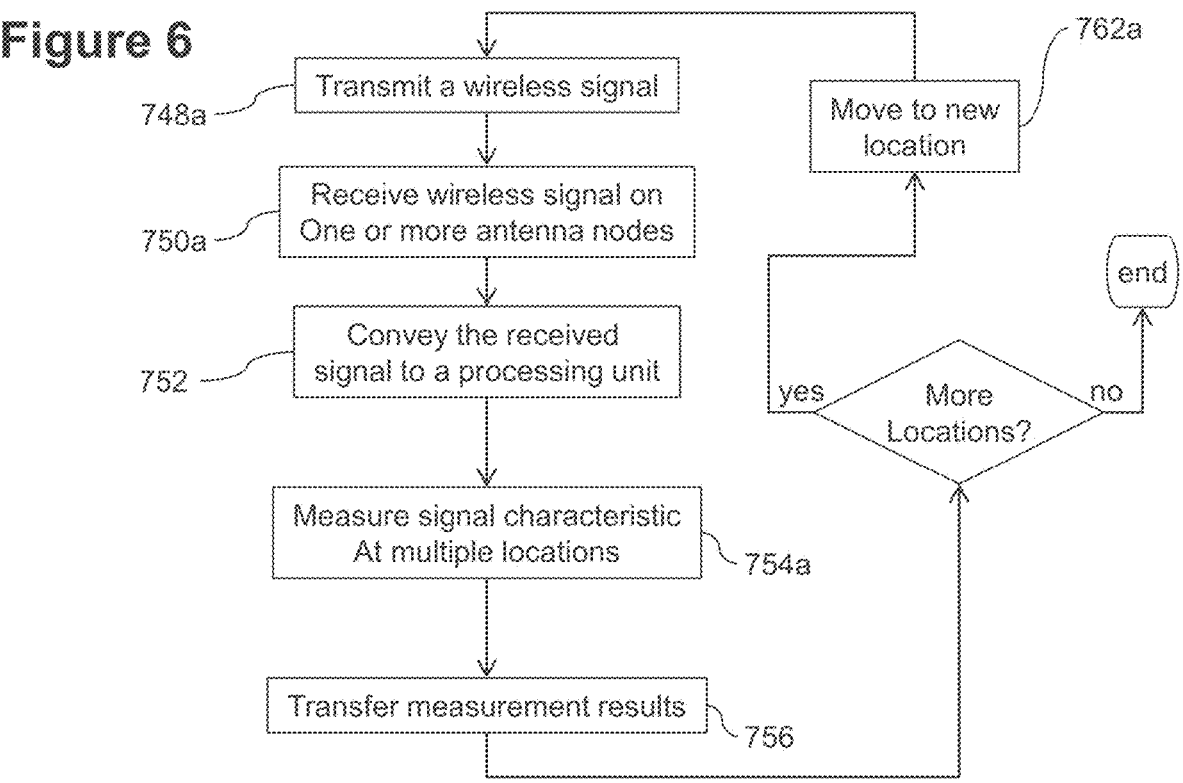
FIG. 6 illustrates a method of testing reception of a DAS system in accordance with an embodiment of the current invention.

FIG. 6 illustrates a method of testing reception of a DAS system in accordance with an embodiment of the current invention. For example, testing reception may be a part of calibrating and/or setting up the DAS system. Optionally one or more wireless signal is transmitted to the DAS system. Optionally, for each signal the power and/or the content and/or the location of the transmission may be known. In some embodiments, the signals are received by multiple antenna nodes and conveyed over to a cable (for example a riser). For example a combined signal from the riser may be conveyed to one or more processing units (for example a CCU and/or an external processor). Optionally, characteristics of the signal are measured at multiple points in the system and transferred to the processing unit. Optionally, the processor may determine a preferred characteristic of a component of the system and/or a strategy for enhancing a signal. For example, characteristics of the component of the system may include a transmission characteristic of an adjustable coupler and/or an adjustable attenuator. For example, the processing may be based on the known characteristics, the combined signal and/or data about reception at one or more locations. In some embodiments, a command will be transferred to one or more adjustable components of the system to implement the preferred characteristic. Optionally data and/or instructions will be stored for use in signal enhancement processing.

In some embodiments a wireless signal is transmitted 748a to one or more antenna nodes of a DAS system. Optionally, the wireless signal may include a test signal transmitted 748a from one or more isolated DAS antenna nodes. Alternatively or additionally, a fixed antenna may be used for testing the system. Alternatively or additionally, the wireless signal may be a test signal sent by a portable wireless device. Optionally the content and/or characteristics of a test signal may be known (for example the location of the transmitter, the power, the time of transmission etc.). Alternatively or additionally, the wireless signal may include a communication signal transmitted 748a by portable receiver using the DAS system. Alternatively or additionally, the wireless signal may include a communication signal being transmitted 748a by a node of the DAS system and/or a fixed antenna.

In some embodiments, the transmitted signal is received 750a at one or more of the antenna nodes of the DAS system. Optionally, the wireless RF signal may also be received 750a by other supplementary measuring antennas for testing the signal at various points inside and/or outside the DAS domain. Optionally, the some or all of the antennas will convey 752 the received RF signal to a transceiver and/or a data storage unit and/or processing unit. For example, the DAS antennas may each convey 752 the received RF signal over a shared riser. Alternatively or additionally, another conveyance medium may be supplied. For example, a separate conveyance channel may be supplied to convey 752 a received RF signal from one or a subset of DAS nodes to the transceiver and/or processing unit. In some embodiments, a combined signal will be conveyed 752 to the processing unit. Alternatively or additionally, in some embodiments, testing the system will be performed based on measurements, but the received signal may not be conveyed 752 to a transceiver and/or a processing unit during testing.

In some embodiments, characteristics of a received signal may be measured 754a at various locations around the DAS domain. For example, one or more DAS nodes may include a sensor that measures 754a characteristics of the signal received at that node. Alternatively or additionally, a centralized sensor may be supplied with a way to measure 754a signals at isolated nodes and/or locations. Optionally measurements 754a may be made at other locations around the domain.

In some embodiments measured data is transferred 756 to a data processing unit and/or a data storage unit. For example, data may be modulated onto a riser and transferred 756 to the processing unit and/or data storage unit. Alternatively or additionally, data may be transferred on another medium.

In some embodiments, the reception of a DAS system may be tested by transmission scanning the DAS domain (for example a building and/or other area covered by the DAS system). For example, transmission scanning may include transmitting 748a different signals simultaneously from different points in the domain and/or on different bands. For example, transmission scanning may include moving a transmitter from point to point in the domain and/or transmitting 748a one or more signals at each point. For example, after transmitting from one or more locations, one or more transmitters may be moved 762a to transmit from another location until a sufficient sample of locations has been tested around the domain. For example, transmission scanning may be performed during setup, testing and/or calibration of the system.

In some embodiment a DAS antenna node will be tested independently of other antennas and/or transmitters. For example, a sensor may be supplied to measure 754a VSWR at an antenna mode. Optionally, the test results may be transferred 756 to a CCU. Alternatively or additionally, the test result may be processed locally and/or a warning may be transferred 756 to the CCU when the results indicate a problem. In some embodiments, transfer of measurements and/or warnings may be over a riser and/or another channel.

In some embodiments, when the system is in use, signal characteristics are measured at multiple antenna nodes. The measured characteristics are optionally used to estimate the location of the source of a signal. For example, a signal may be received from a portable transmitter at an unknown location in the building. The signal strength is optionally measured at one or more antenna nodes. According to the signal strength, the location of the signal source may be estimated. For example, if the signal is received only at one antenna and/or more strongly at one antenna than the others, the source is estimated as being near that antenna. For example, if the signal is received by antennas only on one floor of a building and/or more strongly on the one floor than the others, the source is estimated as being on that floor. For example, if the signal is received by only at two antennas and/or more strongly at two antennas than the others, the source is estimated as being between the two antennas.

Alternatively or additionally, during system setup and testing, a database is made correlating measured signal characteristics at multiple antenna nodes to transmitter location. When a signal is received, the received characteristics of the signal are optionally compared to the database to estimate the location of the transmitter. For example, the database may be stored on a computer memory for example in the CCU. For example, comparison between measured signal characteristics and the database may be performed by a processor, for example in the CCU. For example, location information may be used to locate a first responder in the building. For example the location may facilitate search and rescue of the first responder and/or of civilians in his vicinity.

Figure 7:
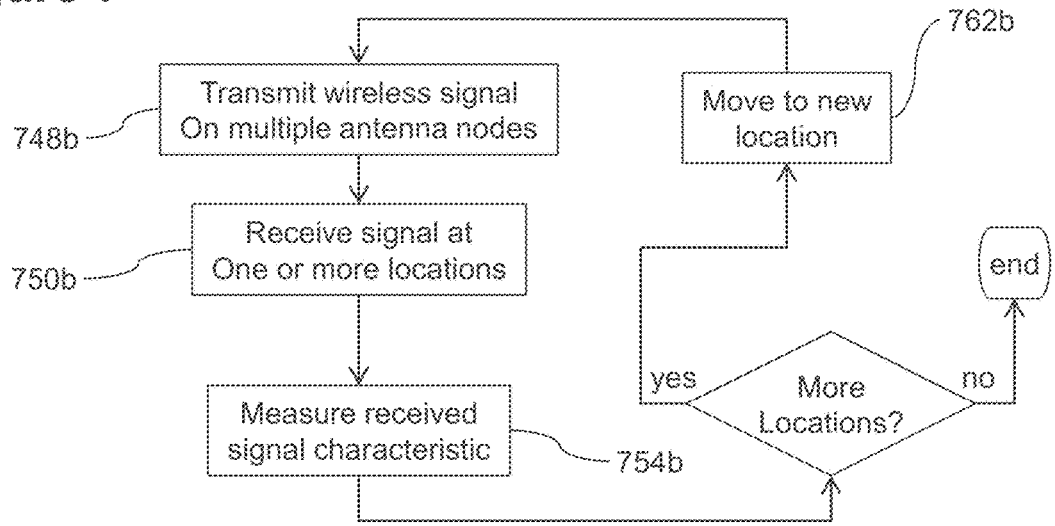
FIG. 7 illustrates a method of testing transmission of a DAS system in accordance with an embodiment of the current invention.

FIG. 7 illustrates a method of testing transmission of a DAS system in accordance with an embodiment of the current invention. For example, testing transmission may be a part of calibrating and/or setting up the DAS system. Optionally one or more wireless signals are transmitted by the DAS system. Optionally, for each signal the power and/or the content of the transmission may be known. In some embodiments, the signals are received by multiple receivers and/or measured at multiple points inside and/or outside the DAS domain. Optionally, the processor may determine a preferred characteristic of a component of the system. For example, the processing may be based on the known transmission characteristics, a combined signal conveyed to the processor, and/or data about reception at one or more locations. In some embodiments, a command will be transferred to one or more adjustable components of the system to implement the preferred characteristic. Optionally data and/or instructions will be stored for use in future calibration and/or adjustment and/or testing of the system. Optionally during transmission one or more antenna nodes will be isolated. For example, isolation is described herein above in respect to FIG. 5. For example a different signal may be transmitted by a different antenna and/or a signal may be transmitted by one or a few antennas of the system. Isolating antennas optionally allows more precise determination of antenna tuning to achieve coverage and/or avoid interference.

In some embodiments a wireless RF signal is transmitted 748b over one or more nodes of the DAS system. Optionally the wireless RF signal is received 750b at one or more locations in the domain and/or outside the domain. For example, a transmission strength may be tested outside the DAS domain in order to avoid interfering with another network and/or to keep within regulatory limits of external interference. Optionally the wireless RF signal is received using a portable receiver. In some embodiments, a characteristic of the received wireless RF signal may be measured 754b at one or more points around the system. An area within the DAS domain and/or outside the domain may be scanned. For example, a receiver may be moved 762b around the domain and/or outside the domain sampling one or more locations until a test area has been sufficiently sampled.

Figure 8A:
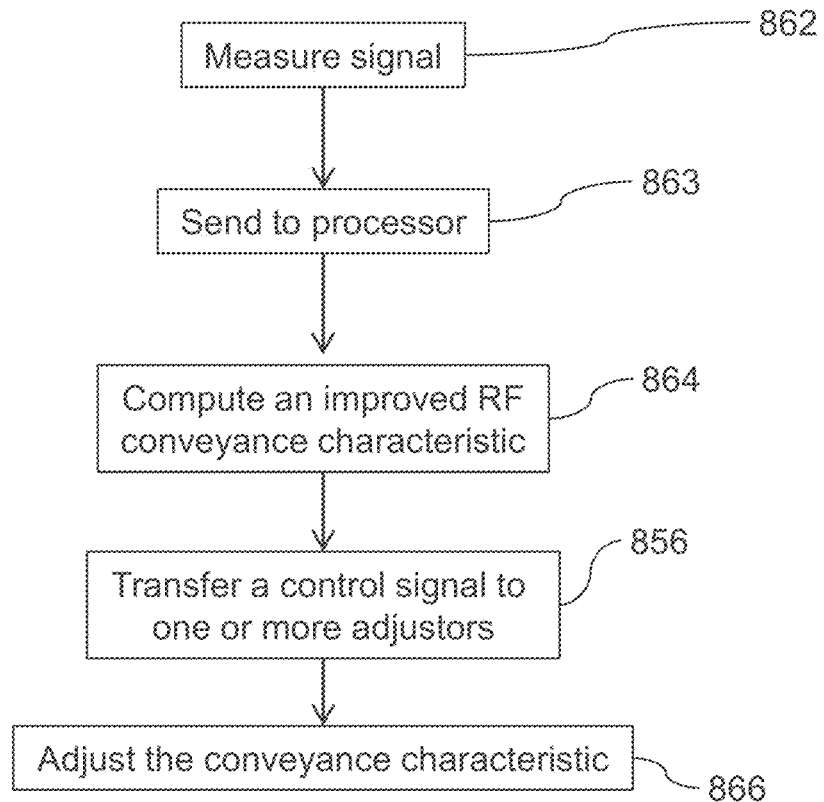
FIG. 8A is a flow chart illustration of a method of adjusting a DAS system in accordance with an embodiment of the current invention.

FIG. 8A is a flow chart illustration of a method of adjusting a DAS system in accordance with an embodiment of the current invention. In some embodiments, a wireless signal and/or measured characteristics of the signal may be processed to determine an enhanced conveyance characteristic of the DAS system. Based on the results, a command is optionally transferred to an adjustable component of the DAS system to adjust the conveyance characteristic.

In some embodiments, signal attributes may be measured 862. Optionally, a sensor may sense a local characteristic of a signal, for example at an antenna node and/or on a riser cable and/or at a coupler. Optionally the measurement may be transferred 863 to a processor. Alternatively or additionally, a sensor may be directly connected to an integral processor. For example, the integral processor may determine when a measurement is significant. Optionally, when the data is significant the integral processor transfers data and/or transfers the result of the processing to a further processor and/or the integral processor may determine a strategy (for example computing 864 an improved conveyance characteristic for one or more components of the system) to enhance the system. The integral processor may transfer 856 a command to an adjustable component of the system to adjust 866 itself to implement the strategy. Alternatively or additionally, a single component may include a sensor, a processor and/or an adjustable element. For example, a coupler may include a sensor, a processor and/or an adjustable element. For example, the sensor may measure 862 a signal characteristic at the coupler and/or the processor may process the data to compute 864 and improved conveyance characterized and/or adjust 866 the conveyance of the coupler.

In some embodiments a measurement 862 used to adjust 866 a DAS system may include a measurement 862 of an incoming wireless signal and/or an outgoing signal. Optionally the measured signal may include a signal sent during the normal operation of the system and/or the signal may include a test signal. In some embodiments, the content, transmission location and/or other characteristic of the signal may be known. Alternatively, they may not be known. Optionally, the system will be periodically tested. For example, periodic testing may be performed when the system is not in use. For example, a test signal may be periodically transmitted to or from one, some or all of the antenna nodes. For example, a response of the system may be measured 862 and/or analyzed.

In some embodiments, RF signals, raw data, processed data and/or commands may be conveyed 863 and/or transferred 856 between components of a DAS system. Optionally RF signals may be conveyed 863 directly over a riser cable. Alternatively or additionally, RF signals may be transferred 856 as data over a riser cable. Alternatively or additionally conveying 863 and/or transferring 856 are over a wireless channel. Alternatively or additionally, conveying 863 and/or transferring 856 are over a hard wired channel other than the riser, for example over an optical cable, over a dedicated cable, over an electrical power network, and/or over another network.

Optionally processing (e.g. computing 864 enhanced conveyance parameters) may include comparing measured 862 values to stored data and/or processing one or more measured 862 values with a stored algorithm. The measuring 862, computing 864 and/or adjusting 866 are optionally local to a particular branch and/or node of the system. Alternatively or additionally, the measuring 862, computing 864 and/or adjusting 866 may include multiple branches and/or nodes of the system and/or a central processor and/or a remote processor. For example, an array of parameters measured 862 and/or computed 864 from a received and/or transmitted signal may be compared to parameters measured and/or computed during setup and/or previous calibration of the system. Optionally, conveyance parameters of the system may be adjusted 866 to bring the current signal parameters closer to the parameters during calibration and/or set up.

In some embodiments, an adjustment may be determined and/or performed locally within the system. For example, a coupler may be configured and/or programmed to recognize when the strength of a signal is large enough to cause undesired interference (for example undesired interference may affect signals from portable transmitters in the DAS domain and/or undesired interference may affect another antenna node of the DAS system and/or undesired interference may affect transceivers outside the system (for example outside of the DAS domain and/or on another network)). In some embodiments, the coupler may include a sensor that measures 862 strength of signal from the riser to the antenna and/or a processor that processes data about a signal to determine when the strength is too high. Alternatively or additionally, a sensor on a riser may measure 862 signal strength and send the measured value to the coupler. Optionally, when the outgoing signal strength is too high, the coupler may be adjusted 866, for example by decreasing a coupling factor and/or increasing an attenuation of the coupler, to reduce the power of the outgoing signal. For example, a signal characteristic may be compared to a value provided during set up and/or calibration of the system. For example, when the outgoing signal strength is greater than a threshold, the coupling factor may be reduced and/or the attenuation may be increased. For example, the threshold may be updated. For example, a CCU may send a command to the coupler to change a threshold value. Optionally the coupler will automatically adjust 866 to control outgoing signal strength to achieve a desired signal strength.

In some embodiments, a measure of VSWR may be used to estimate the state of an antenna node. For example, when a signal is transmitted (e.g. an operation communication signal and/or a test signal) the VSWR may be measured 862. When the VSWR is not at a desired value the adjustable components connected to the antenna node may be adjusted 866 to improve the VSWR and/or a broken component of the antenna node may be fixed and/or replaced.

In some embodiments a test signal may be transmitted by one or a few transmitting nodes. Alternatively or additionally, the signal may be received and/or measured 862 at one or more receiving nodes. For example, some or all of the transmitting and/or receiving nodes will be isolated from other nodes. Optionally isolation of certain nodes will facilitate testing particular parts of the system. Optionally, the received signal, for example a combined signal from the one, all or some of the receiving nodes, will be conveyed over a riser to a CCU. Optionally, the signal may be measured 862 on the riser and/or at the CCU. Optionally, measurements of the signal at various locations in the system will be transferred to a processor. For example, the processor will compute 864 improved RF conveyance characteristics of the system. For example, the processor may compare the received signal and/or the measure data to the transmitted signal and/or historical data.

In some embodiments, the system will be adjusted 866 based on received signals. For example, a signal transmitted by a portable transceiver from one or more locations in the domain may be received on one or more nodes. The signal and/or measurement data may optionally be sent 863 to a processor. The processor will optionally compute 864 adjustments for conveyance characteristics of the system and/or adjust 866 the conveyance characteristics to improve signal reception. Optionally, the computations are based on the received signal, measurements of the signal, previously measured data and/or stored algorithms. Optionally the computations may be modified using computer learning or other techniques.

Figure 8B:
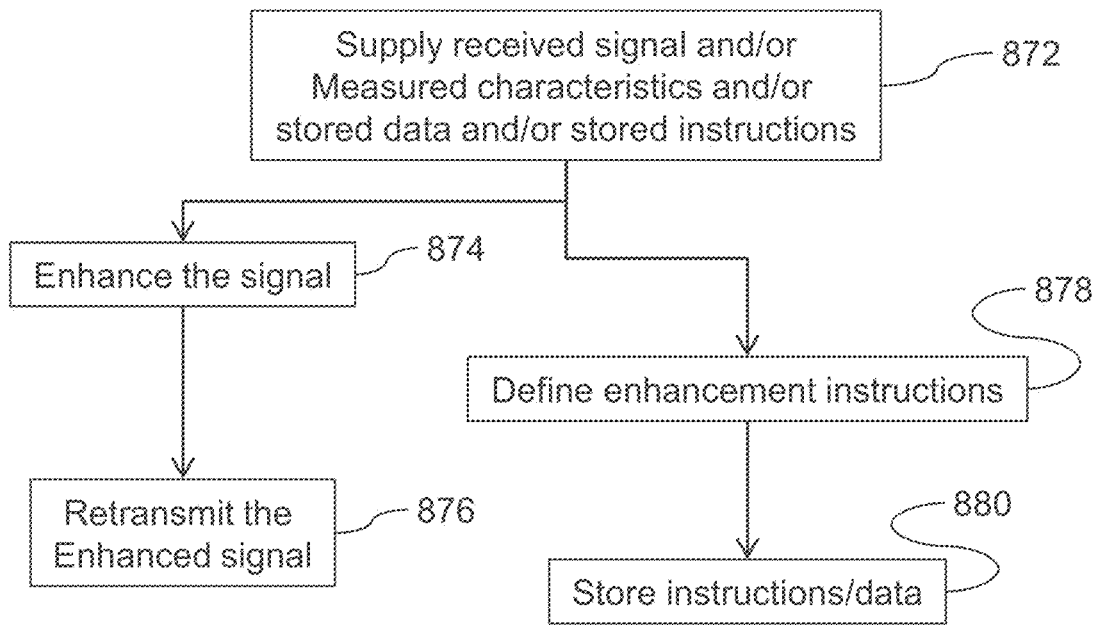
FIG. 8B illustrates a method of enhancing a signal in accordance with an embodiment of the current invention.

FIG. 8B illustrates a method of enhancing a signal in accordance with an embodiment of the current invention. In some embodiments, a combined signal including noise and/or multipath interference may be conveyed to a processor. Optionally, measurements of the signal at different points in the DAS system and/or DAS domain are transferred to the processor. Optionally stored instructions (for example a signal processing algorithm) and/or data (for example measurements of known signals during system testing) are supplied 872 to the processor. For example, the data and/or algorithms may be stored on a storage medium. Using the supplied signal, data and/or instructions, the processor optionally enhances 874 the signal. For example, the processor may compare the measurement data of the current signal to measured data of signals during system testing. Optionally, the processor may determine how the signal was degraded and/or how the signal can be enhanced. Optionally, the processor outputs an enhanced signal. The enhanced signal is optionally conveyed over a riser and/or retransmitted 876 over the antenna nodes. Alternatively or additionally, an enhanced signal may be retransmitted 876 to an external network or device, for example over a donor antenna. Optionally, in a duplex system the original signal was received on a portable transmission channel and the enhanced signal is retransmitted over a repeater transmission channel.

In some embodiments a processor will define 878 new enhancement instructions and/or store 880 the instructions and/or store 880 data. For example, the stored data may be based on the current signal, measurements and/or processing results. For example, the processor may include a machine learning routine to continue to improve signal enhancement. Alternatively or additionally, data stored over time may be used to develop an improved database including processed data and/or a larger library of data for signal enhancement.

Figure 9:
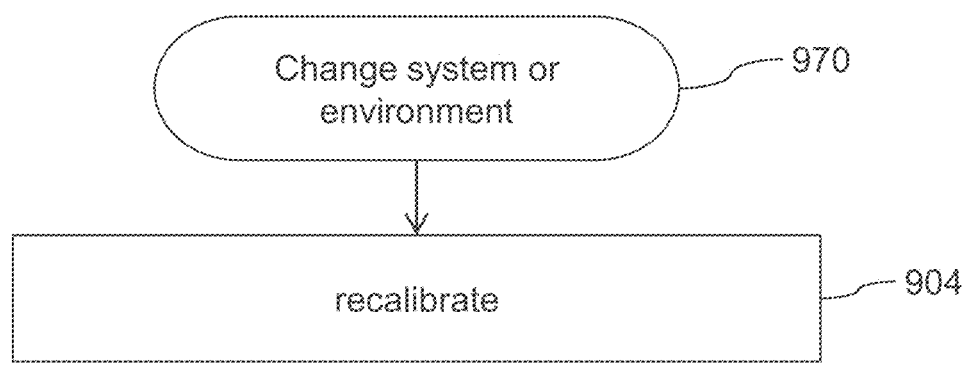
FIG. 9 illustrates a method of modifying and/or adapting a DAS system in accordance with an embodiment of the current invention.

FIG. 9 illustrates a method of modifying and/or adapting a DAS system in accordance with an embodiment of the current invention. In some embodiments, a DAS system may be recalibrated in response to a change in the system and/or the environment.

In some embodiments, maintenance and/or aging may bring about changes 970 to a DAS system. For example, as components age, their performance may change 970. Alternatively or additionally, performance of system components may change 970 as they age or fail and/or when a component is replaced. Alternatively or additionally, changes 970 in the environment of a DAS system (for example changes 970 and/or additions to a building) may affect DAS performance of the system. In some embodiments additional components are added to a DAS system, for example to cover additional areas of a domain (for example additions to a building). Optionally, a DAS system may be recalibrated 904 periodically and/or in response to an occurrence (for example replacing of a component, changes 970 in a DAS domain and/or regulatory changes 970 and/or in response to damage to the system for example during a fire and/or in response to a change in traffic that requires changing 970 the system and/or addition temporary components in an emergency). For example, during emergency use, fire may damage one of the antenna nodes. Optionally the system will be recalibrated 904. For example, recalibration 904 may extend the useful lifetime of the system by facilitating system maintenance and/or upgrade. Alternatively or additionally, recalibration 904 will make the system more reliable in situations where parts of the system may be damaged and/or conditions may change 970.

Alternatively or additionally recalibration 904 may reduce the cost of system upkeep. For example, the system may be adjusted without replacing parts and/or it may be possible to replace only a few parts and adjust the rest of the system. Alternatively or additionally recalibration 904 may make the system more flexible (e.g. the system will continue to used and/or not need to be replaced when a building is refurbished and/or changed 970 and/or when regulations change 970) and/or the system will be able to adapt to working condition and/or RF traffic that were not predicted with the system was originally installed.

In some embodiments, recalibration 904 includes testing the system, for example as described in the current application with respect to any of the embodiments described herein. Testing may reveal for example that performance of the system can be improved by adjusting a conveyance parameter of the system. Optionally recalibration 904 includes computing an improved conveyance parameter and/or adjusting an adjustable component of the system (for example as described in any of the embodiments of the system herein).

Figure 10:
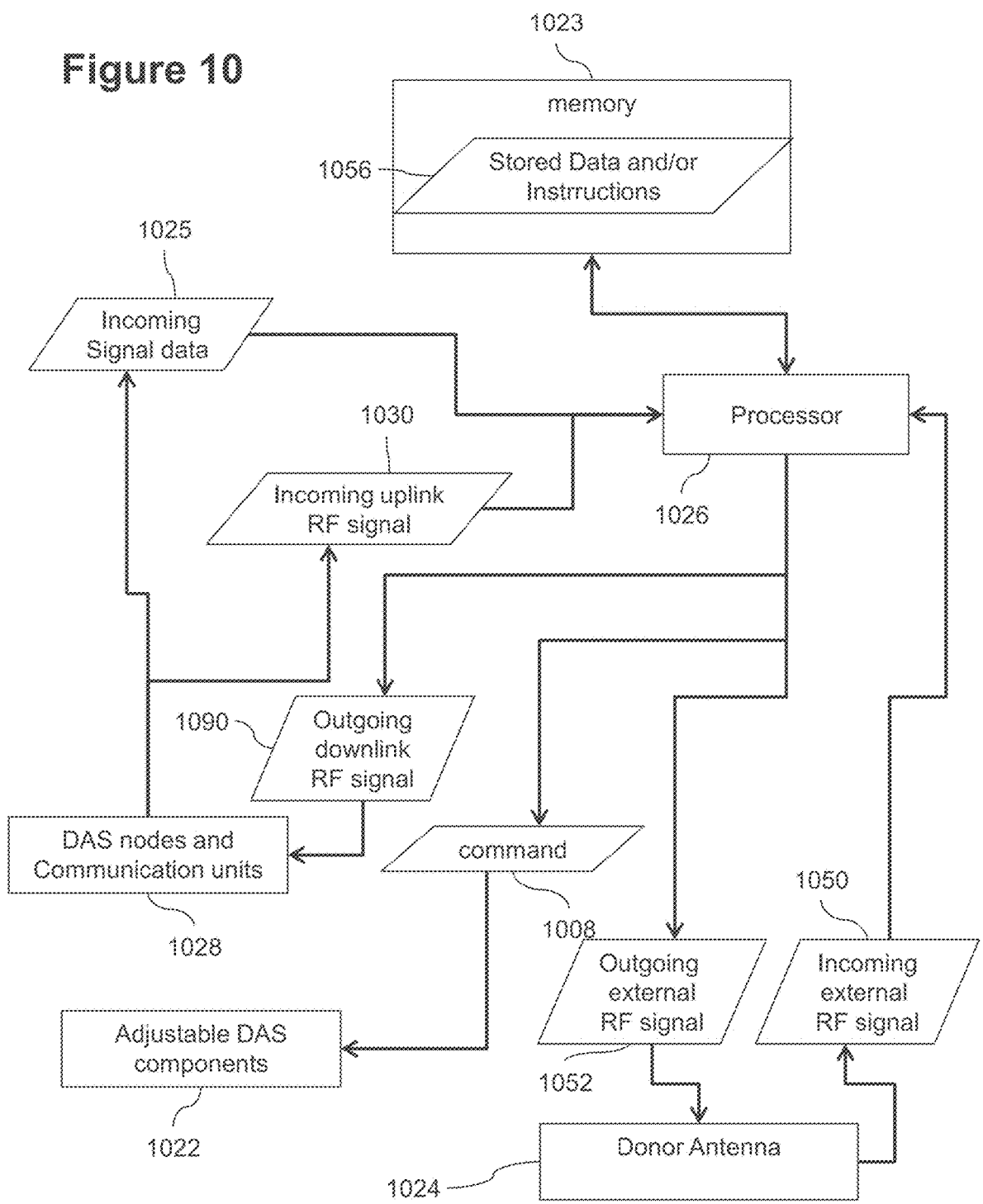
FIG. 10 is a schematic illustration of data flow in a network in accordance with an embodiment of the current invention.

FIG. 10 is a schematic illustration of data flow in a network in accordance with an embodiment of the current invention. In some embodiments a processor receives RF signals and/or data about the signals. The processor is optionally connected to a data storage device. For example, the data storage device may include software instructions and/or data that are used to process signals and/or to determine adjustments in the network. Optionally the processor may output commands to adjust the network. Optionally, RF signals, commands and/or data within the DAS network may be conveyed on a fire resistant medium, for example a fire resistant and/or coaxial cable. Optionally the processor outputs signals, for example RF signals to DAS antenna nodes in a DAS domains and/or RF signals for an external network may be sent to a donor antenna. Optionally, the processor enhances RF signals before outputting them. The processor optionally updates and/or modifies data and/or instructions in the memory.

In some embodiments, a processor 1026 may receive an RF signal from one or more antenna nodes 1028. Optionally, the signal may be a combined RF signal from multiple antenna nodes conveyed over a single riser cable and/or over a shared conductor of the cable. Alternatively or additionally, processor 1026 may receive signal data. For example, signal data 1025 may include telemetry from one or more nodes about the signal as it was received at the node. Alternatively or additionally, the signal data 1025 may include a digitized signal for example from an active node. In some embodiments, the data 1025 and/or signal 1030 may be stored in short term memory. For example, processor 1026 may have access to memory 1023. Optionally, memory 1023 may include short term memory and/or long term memory. For example, the long term memory may store data, for example, from system set up and/or calibration. Alternately or additionally, memory 1023 may include algorithms for signal processing. Optionally, memory 1023 and/or processor 1026 reside in a CCU. Alternatively or additionally, processing and/or memory resources may be distributed amongst one or more computing units in other parts of the system. Alternatively or additionally an external processor and/or memory may be included.

In some embodiments, the processor will process an incoming signal 1030. For example processing may be based on received data 1025 and/or stored data 1056. For example, enhancing a signal may include amplification of a desired portion of the signal, reduction of noise (for example multipath noise) and/or reduction of interference (for example co-channel interference). In some embodiments, processor 1026 will output signal 1090 for rebroadcast on one, some or all of the DAS nodes for example as a downlink signal 1090. For example, all or part of signal 1030 may be rebroadcast to as a downlink signal 1090. For example, signal 1090 may be an enhanced signal. Alternatively or additionally, signal 1090 may include all or part of an external signal 1050. For example, external signal 1050 may be received by processor 1026 from a donor antenna 1024

In some embodiments, a signal may be sent to an external network. For example, all or part of signal 1030 may be rebroadcast to an external network as an outgoing signal 1052. Outgoing signal 1052 is optionally enhanced by processor 1052. Optionally, outgoing signal 1052 is transmitted over a donor antenna 1024. Optionally rebroadcasting is on a different band than the received signal. For example in a duplex network, a signal may be received over an uplink band and rebroadcast over a downlink band. Alternatively or additionally, a signal may be rebroadcast on the same band as it was received, for example in a simplex network.

In some embodiments, processor 1026 will determine an improved characteristic of the DAS network. Optionally, processor 1026 will send a command 1008 to an adjustable network component 1022 to adjust a characteristic (for example a conveyance parameter in one or more directions on one or more frequency bands for example an attenuation).

Embodiments of the current invention may include only some of the processes described above or all of them.

Dimensions

In some embodiments the distance along a riser cable between a connection to a CCU and a splitter connection to an antenna node may range, for example, between 5 m to 20 m and/or between 20 m to 50 m and/or between 50 m and 200 m and/or between 200 m to 1000 m.

In some embodiments the distance a CCU and an antenna node may range, for example, between 5 m to 20 m and/or between 20 m to 50 m and/or between 50 m and 200 m and/or between 200 m to 1000 m.

In some embodiments the distance two antenna nodes may range, for example, between 5 m to 20 m and/or between 20 m to 50 m and/or between 50 m and 200 m and/or between 200 m to 1000 m.

In some embodiments, the power of a signal reaching an antenna node from a CCU may range between 1 to 30 mW and/or between 30 to 70 mW and/or between 70 to 150 mW and/or between 150 to 1000 mW.

It is expected that during the life of a patent maturing from this application many relevant DAS components and/or signal processing technologies will be developed and the scope of the terms coupler, processor, sensor, cable, and instructions are intended to include all such new technologies a priori.

As used herein the term "about" refers to ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A radio repeater system comprising:
   a plurality of peripheral devices, wherein each one of said plurality of peripheral devices comprises:
     an antenna node for receiving and transmitting emergency audio band radio waves;
     a peripheral communication unit for converting said emergency audio band radio waves to radio-frequency (RF) signals for conveying over a shared conductor of a riser cable, and converting said RF signals to said emergency audio band radio waves; and
     a variable coupler for changing a coupling factor of said RF signal to said shared conductor in response to a control signal received over said shared conductor; and
   a central control unit (CCU) comprising:
     a central communication unit for transmitting and receiving RF signals simultaneously to and from said shared conductor;
     a processor for producing said control signal; and
     a data bus for transferring said control signal to said variable coupler over said shared conductor.

2. The radio repeater system of claim 1, wherein said communication unit comprises a Bi-Directional Amplifier.

3. The radio repeater system of claim 1, wherein:
said peripheral device further comprises a sensor for registering a characteristic of at least one said respective RF signal received on at least one of said peripheral devices; and
said peripheral communication unit in said peripheral device is configured to send a combined signal including said RF signal and an additional RF signal comprising a value of said characteristic via said shared conductor.

4. The radio repeater system of claim 1, wherein the CCU is configured to produce said control signal to achieve even coverage of a covered area.

5. The radio repeater system of claim 1, wherein the CCU is configured to produce said control signal to achieve a different coupling factor on a downlink than on an uplink.

6. The radio repeater system of claim 1, wherein the CCU is configured to produce said control signal to achieve a lower coupling factor on a downlink than on an uplink.

7. The radio repeater system of claim 3, wherein said processor comprised in said CCU is configured for estimating the location of a portable transmitter based on said characteristic.

8. The radio repeater system of claim 7, wherein said estimating is based on comparing said characteristic from a plurality of said antenna nodes to a database correlating previously measured signal characteristics at multiple antenna nodes to said location of said portable transmitter location.

9. The radio repeater system of claim 3, wherein:
said CCU is further configured for:
processing said characteristic and said combined signal; and
outputting an enhanced version of said RF signal; and
said central communication unit is configured to retransmit said enhanced signal.

10. The radio repeater system of claim 9, wherein said CCU
is further configured for:
processing said characteristic and said combined signal; and
outputting an enhanced version of said RF signal; and
said central communication unit is configured to retransmit said enhanced signal to and from said antenna nodes.

11. The radio repeater system of claim 10, wherein said central communication unit is configured to retransmit said enhanced signal to an external network via a donor antenna.

12. The radio repeater system of claim 9, wherein said sensor uses externally supplied electrical power, the system further comprising:
a power converter for receiving electrical power from said riser cable and transferring said power to at least one components selected from a group consisting of:
said sensor; and
said variable coupler.

13. The radio repeater system of claim 3, further comprising:
a database of system testing results obtained while calibrating a coverage area, wherein said central control unit is further configured for comparing said value of said characteristic and said system testing results and outputting a command to change a coupling of said RF signals of at least one variable coupler of said plurality of peripheral devices with respect to at least one other variable coupler of said plurality of peripheral devices.

14. The radio repeater system of claim 1, wherein said CCU comprises a program for:
transmitting an outgoing signal to a first antenna node of said plurality of peripheral devices;
receiving a reflected version of said outgoing signal from said first antenna node of said plurality of peripheral devices; and
processing said reflected version to determine a performance of said antenna node based, at least in part, on calculating VSWR (Voltage Standing Wave Ratio), thereby estimating a state of the first antenna node.

15. The radio repeater system of claim 14, wherein said processing includes comparing said reflected version to said outgoing signal.

16. The radio repeater system of claim 14, wherein said CCU further comprises a program for detecting a damaged antenna connection.

17. The radio repeater system of claim 1, wherein said CCU comprises a program for:
isolating at least one antenna node of said plurality of peripheral devices;
transmitting an outgoing signal over a first antenna node of said plurality of peripheral devices;
receiving a received version of said outgoing signal from a second antenna node of said plurality of peripheral devices; and
processing said received version to determine a performance of at least one of said at least one node and said at least another node.

18. The radio repeater system of claim 17, wherein said processing includes comparing said received version to said outgoing signal.

19. The radio repeater system of claim 17, wherein said processing includes comparing at least one characteristic of said received version to a stored value.

20. The radio repeater system of claim 1, configured for:
isolating at least one peripheral device of said plurality of peripheral devices;
transmitting an outgoing signal over said at least one peripheral device;
receiving a received version of said signal outgoing over at least another peripheral device of said plurality of peripheral devices; and
processing said received version to determine a performance of at least one of said at least one peripheral device and said at least another peripheral device,
wherein said at least one peripheral device and said at least another peripheral device are at different locations in an area of coverage of the system, thereby testing system integrity.

21. The radio repeater system of claim 1, wherein said variable coupler comprises a dynamic variable coupler configured to change said coupling factor in response to said control signal.

* * * * *